United States Patent [19]

McCord

[11] Patent Number: 5,489,906
[45] Date of Patent: Feb. 6, 1996

[54] COMPRESSION NETWORK DISPLACED PHASE CENTER ELECTRONIC CORRELATOR

[75] Inventor: Henry L. McCord, Los Angeles, Calif.

[73] Assignee: Hughes Aircraft Company, Los Angeles, Calif.

[21] Appl. No.: 61,337

[22] Filed: Jul. 27, 1979

Related U.S. Application Data

[63] Continuation of Ser. No. 515,495, Dec. 21, 1965, abandoned.

[51] Int. Cl.$^6$ ..................................................... G01S 13/90
[52] U.S. Cl. .............................................. 342/25; 342/189
[58] Field of Search .................................... 342/25, 189

[56] References Cited

U.S. PATENT DOCUMENTS 3,725,915  4/1973  Herman et al. ........................... 342/25

OTHER PUBLICATIONS

J. A. Develet, Jr. "Performance of a Synthetic–Aperture Mapping Radar System." IEEE Trans. on Acrospace and Navigational Electronics, Sep. 1964 pp. 173–179.

Allen et al, "Digital Compressed–Time Correlators and Matched Filters For Active Sonar", Journal of the Acoustical Society of America, vol. 36, No. 1, Jan. 1964, pp. 121–139.

*Primary Examiner*—Gilberto Barrón, Jr.
*Attorney, Agent, or Firm*—Leonard A. Alkov; W. K. Denson-Low

[57] ABSTRACT

A synthetic array processing system which simultaneously develops a plurality of parallel synthetic beams, each beam being spaced in time along a flight path and having different effective phase centers. Means are provided for storing and reading out a plurality of doppler history signals from each of a plurality of range positions and in one embodiment of the subject invention the read out sweep lengths are programmed as a function of the square root of range to allow use of a constant slope focusing oscillator. The center frequency of the doppler histories are offset as a predetermined function of range and applied through a focusing mixer to a time compression filter circuit. A plurality of compressed pulses provided at the output terminal of the compression filter circuit, each represent a doppler history of a point reflector and a synthetic beam and these signals are applied to a display which may be controlled as a function of the square root of range.

7 Claims, 21 Drawing Sheets

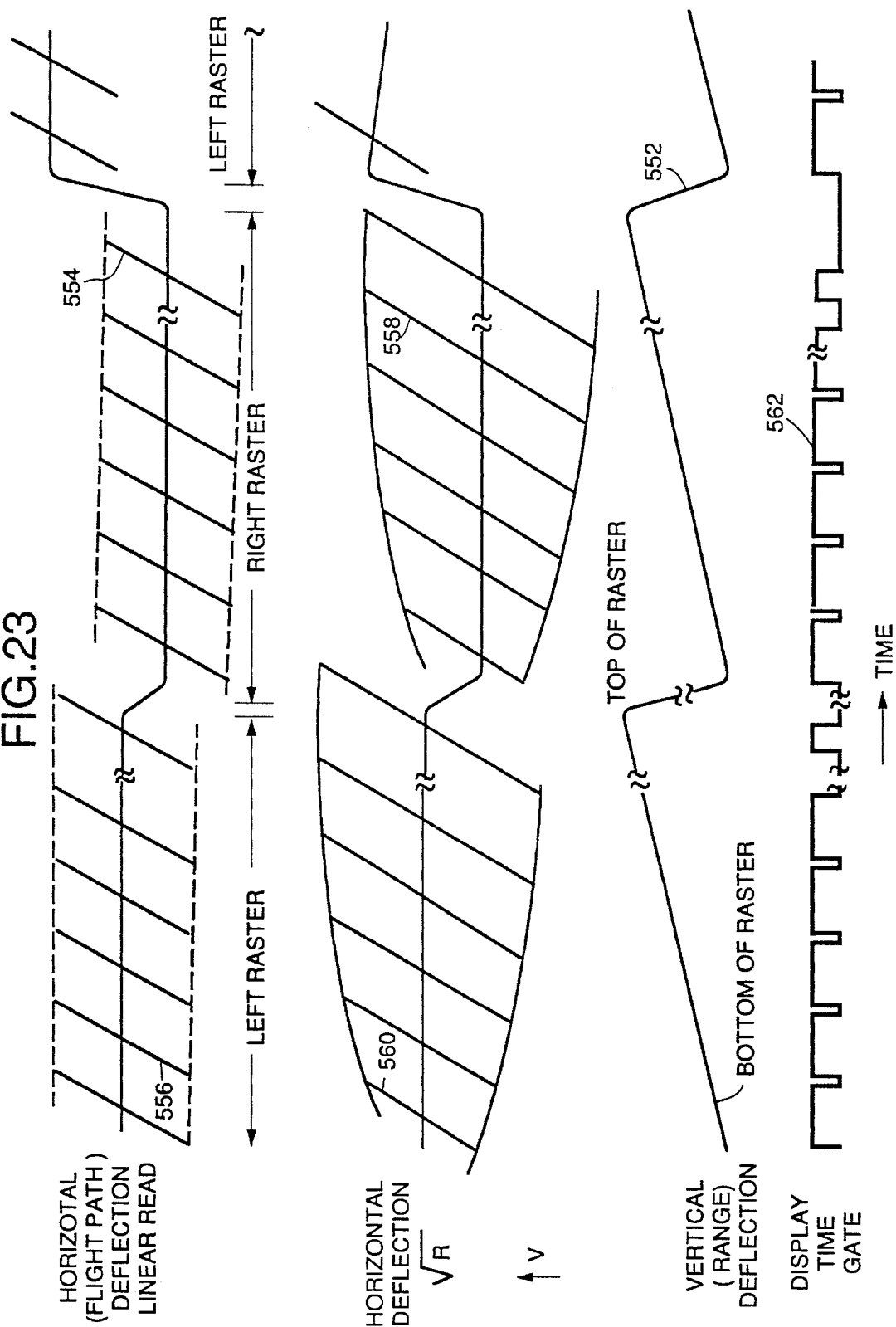

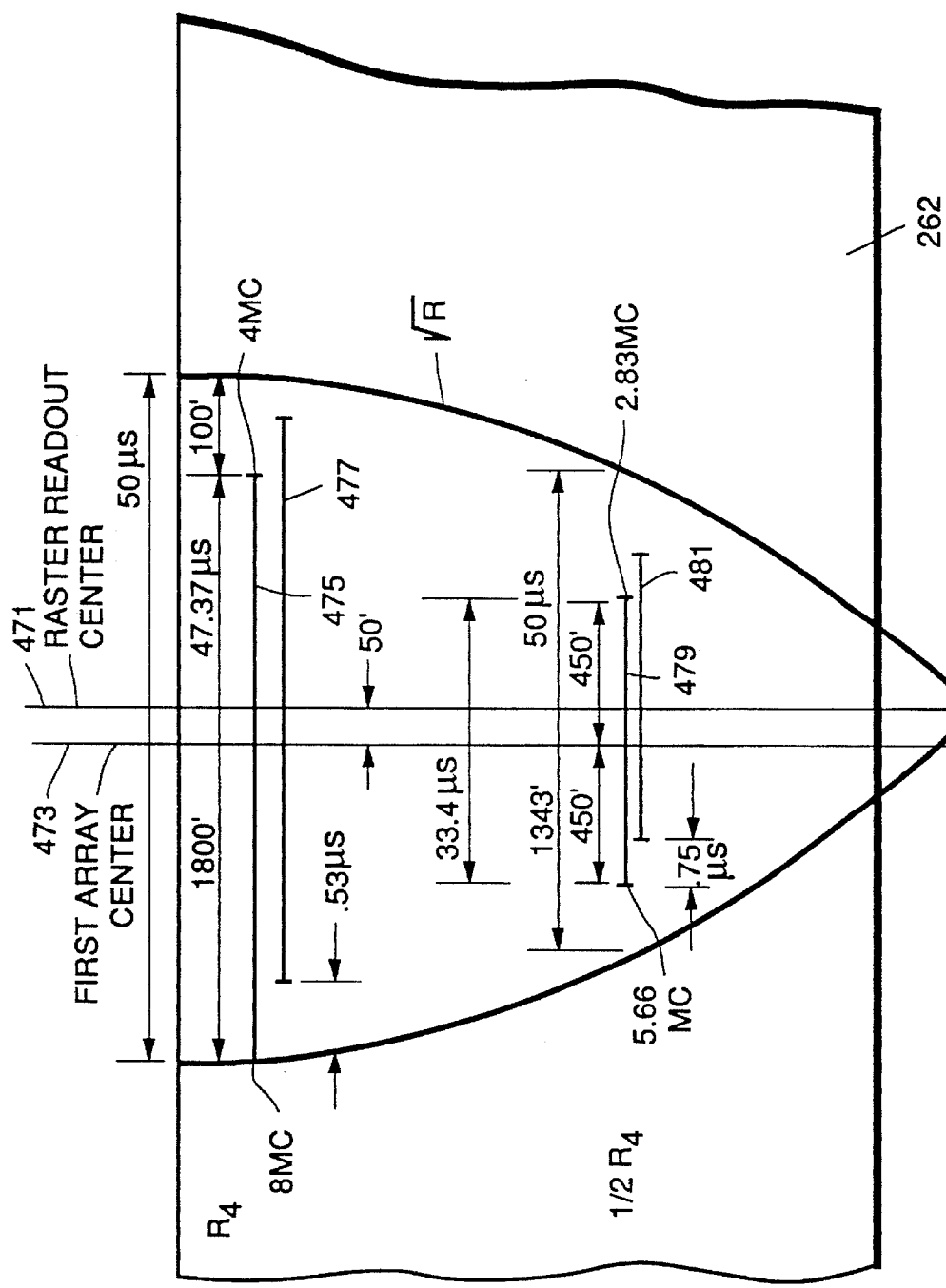

COMPRESSION NETWORK DISPLACED PHASE CENTER ELECTRONIC CORRELATOR

This application is a continuation of application Ser. No. 04/515,495 filed on Dec. 21, 1965 now abandoned.

This invention relates to radar mapping systems and particularly to a simplified and reliable multibeam synthetic array correlating system that provides a high resolution display of the region illuminated by the real antenna.

Synthetic array radar mapping systems are known in which pulses from a coherent radar system are periodically transmitted from an antenna at the side of a moving aircraft and the return doppler signals over a selected range interval are stored on a two-dimension film medium in the form of range traces along changing azimuth positions. A predetermined number of these range traces are scanned in azimuth along successive range elements by a flying spot scanner to develop a plurality of doppler history signals each representing a point reflector. These signals in turn are cross-correlated electronically with a reference function to discriminate against unwanted signal and noise components at all ranges and so that the doppler history signals are substantially independent of range. Thus, radar returns from targets within the selected portion of the region illuminated by the real antenna beam will, when processed, generate frequency components falling within a preselected frequency band and these components are then used to produce a high resolution strip-map or display. The all-range-focused synthetic array thus achieved is characterized by a single very narrow pencil beam falling within the beam pattern of the real antenna.

Another synthetic array radar mapping system that has been developed, is capable of achieving multibeam correlation through the utilization of a bank of narrow band filters, each tuned to a slightly different center frequency within the frequency range of a doppler history signal. In this arrangement, the radar returns from the targets illuminated by the real antenna beam within the selected range interval will, when parallel-processed, generate frequency components falling within one of several preselected spaced apart frequency pass bands, thus providing through processing, the equivalent to a number of high resolution beams, each pointing at a slightly different azimuth angle from a common phase center. By detecting the signals at each pass band filter in some sequence and feeding them accordingly to, for example, a cathode ray tube, a two-dimensional display in real time can be obtained. In this multibeam system, the all-range-focused synthetic array achieved is characterized by a plurality of very narrow pencil beams in like number as there are narrow band filters with all beams pointing at slightly different azimuth angles and all falling within the beam pattern of the real antenna beam.

A synthetic array radar processing system that effectively develops a plurality of simultaneous beams parallel to each other along the flight path, that is, with each effective beam having a different phase center or time position, would have many advantages. In this arrangement, the distance displacement of point objects in each equivalent high resolution beam would be independent of range. Also, this type of processing would allow effective formation of beams over an azimuth distance much greater than the pattern width of the real antenna, which would allow reliable mapping at short ranges. This type of beam formation system would provide a continuous high resolution picture with relatively simple and reliable processing equipment.

It is therefore an object of this invention to provide an improved high resolution synthetic array radar system.

It is another object of this invention to provide an improved and simplified high resolution synthetic array processing system which simultaneously develops a plurality of parallel synthetic beams.

It is still another object of this invention to provide a displaced phase center electronic correlator in which a plurality of parallel effective beams are reliably defined along the azimuth path.

It is a further object of this invention to provide an improved synthetic array processor capable of simultaneously developing a plurality of parallel synthetic beams, each spaced in time along the flight path and having different effective phase centers.

It is a still further object of this invention to provide a synthetic array processor that operates reliably and accurately to form display pulses from the doppler history data.

It is a further object of this invention to provide an improved synthetic array processing system having a minimum complexity that forms pulses from the doppler data while maintaining the required time relations.

Briefly in accordance with the principles of the invention, a synthetic array radar system is provided that achieves multibeam correlation with the multiple synthetically formed beams being simultaneously developed in a displaced phase center mode where each synthetic beam lies parallel to its neighbor pointing in the same direction at spaced intervals along the flight path of a craft or platform on which the radar system is mounted. The signals representative of each synthetic beam are formed from different time excursions of doppler history signals but over substantially the same frequency excursions of the doppler signals. The radar system transmits pulses of energy in a selected direction at a selected angle relative to the aircraft flight path and records the doppler return signals from each range sweep in a first dimension on a storage device such as a storage tube or a film. The azimuth position is represented by the second dimension of the storage device. For processing, the recorded data is read out orthogonally in raster fashion to develop doppler history signals at each range interval. A plurality of doppler history or array signals are read out or formed at each range interval with each signal representing a different point reflector within that interval and with the total doppler frequency excursion being the same for each point reflector. The stored vectors at each range interval are thus combined so that their phase angles are aligned. The echo vector sum at each range is equivalent to RF (radio frequency) vector addition in the waveguide from a large number of feed elements of a very long physical array antenna. In one arrangement in accordance with the invention, the readout sweep lengths are programmed as a function of the square root of range to allow use of a constant slope focusing oscillator. However, this operation results in a shift in the center frequency of each readout line or array as a function of range. The doppler signals are then applied to a frequency translation mixer which injects a frequency offset to the doppler signals as a predetermined function of range. The doppler histories are then focused by compensating the phase or doppler history of each recorded echo for the change in path length over the length of each array. The focusing may be accomplished at all ranges by mixing the doppler history signals against a swept oscillator programmed to focus all signal vectors forming the array by excursing at a slope having a predetermined relation to the readout doppler signals and a selected frequency offset. The modified doppler history signals developed by the focusing mixer may be frequency varying signals occurring at times along the readout trace depending upon the point reflector's position along the flight path. Because the timing during readout of each range line corresponds to the position along the flight path, the doppler histories will encounter the swept oscillator at a different point along its frequency excursion so that each subsequent doppler frequency signal will be frequency displaced in the mixer. The frequency-versus-time slope of the doppler signals is selected to be compatible with a dispersive delay arrangement such as an ultrasonic delay line. The signals at varying frequencies are applied from the focusing mixer to the dispersive line to develop a plurality of compressed pulses during each time period corresponding to a readout line, each pulse representative of a synthetic beam. Because of the time displacement of the doppler histories along each readout line relative to the swept oscillator, the dispersive delay line operates at each different frequency to integrate a different time-displaced point reflector. Each compressed filter output signal is then representative of a point reflector properly positioned in azimuth and range. The corresponding pulses of different readout line periods are related in time so that a plurality of parallel beams are effectively formed at substantially the same time at each range as well as over all ranges. As all point reflectors have the same readout doppler frequency excursions, merely different time versions thereof, the distance along the flight path of each equivalent high resolution beam is independent of range and all effective beams lie parallel to each other producing displaced phase center type processing. By employing the swept oscillator to remove part of the doppler slope, the compression ratio of the dispersive line in one arrangement in accordance with the invention, corresponds to the number of azimuth elements to be processed per readout line rather than the ratio of the array length to the resultant azimuth resolution element. In another arrangement in accordance with the principles of the invention, the readout raster size may be maintained constant and the swept focusing oscillator programmed as a function of range.

The novel features of the invention, as well as the invention itself, both as to its organization and method of operation, will best be understood from the accompanying description taken in connection with the accompanying drawings, in which like reference characters refer to like parts, and in which:

FIG. 23 is a schematic diagram of waveforms showing voltage as a function of time for further explaining the operation of the scan converter storage tube of FIGS. 5 and FIG. 24 is a schematic diagram of the storage medium for further explaining the square root function scanning of the invention.

Figure 1:
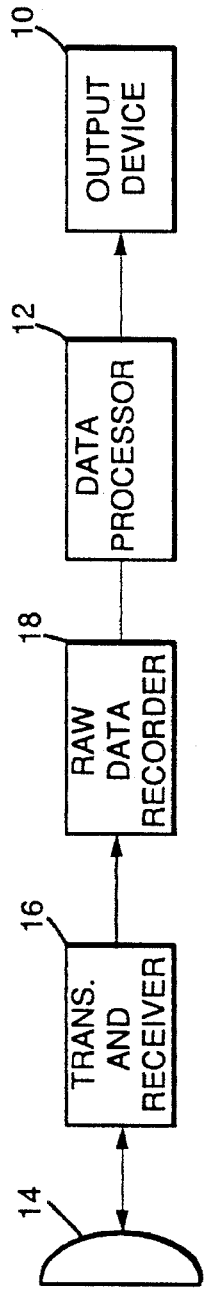
FIG. 1 shows a functional block diagram of a synthetic array processing mapping system in accordance with the invention.

Referring first to FIG. 1, the synthetic array radar and processing system in accordance with the invention includes an output device 10 and a multibeam synthetic array data processor 12 for processing radar return energy received from targets illuminated by a side-looking antenna 14. A transmitter and receiver 16 transmits the pulses of energy and responds to the energy received by the antenna 14 to develop coherent doppler signals which are recorded in a raw data recorder 18. It is to be noted that the antenna 14 may be any type known in the art such as a parabollic reflector or a linear array either having a fixed or selectively variable direction of pattern relative to aircraft axis in accordance with the principles of the invention. Also, it is to be understood that the output device 10 may be either or any combination of a display or storage device or an arrangement for transmitting or transferring data to other locations, in accordance with the invention. Also the output device 10 may be a system for utilizing the processed data such as a network analyzing the signals to select point reflectors and develop signals representative of the position and intensity characteristics of those points.

Figure 2:
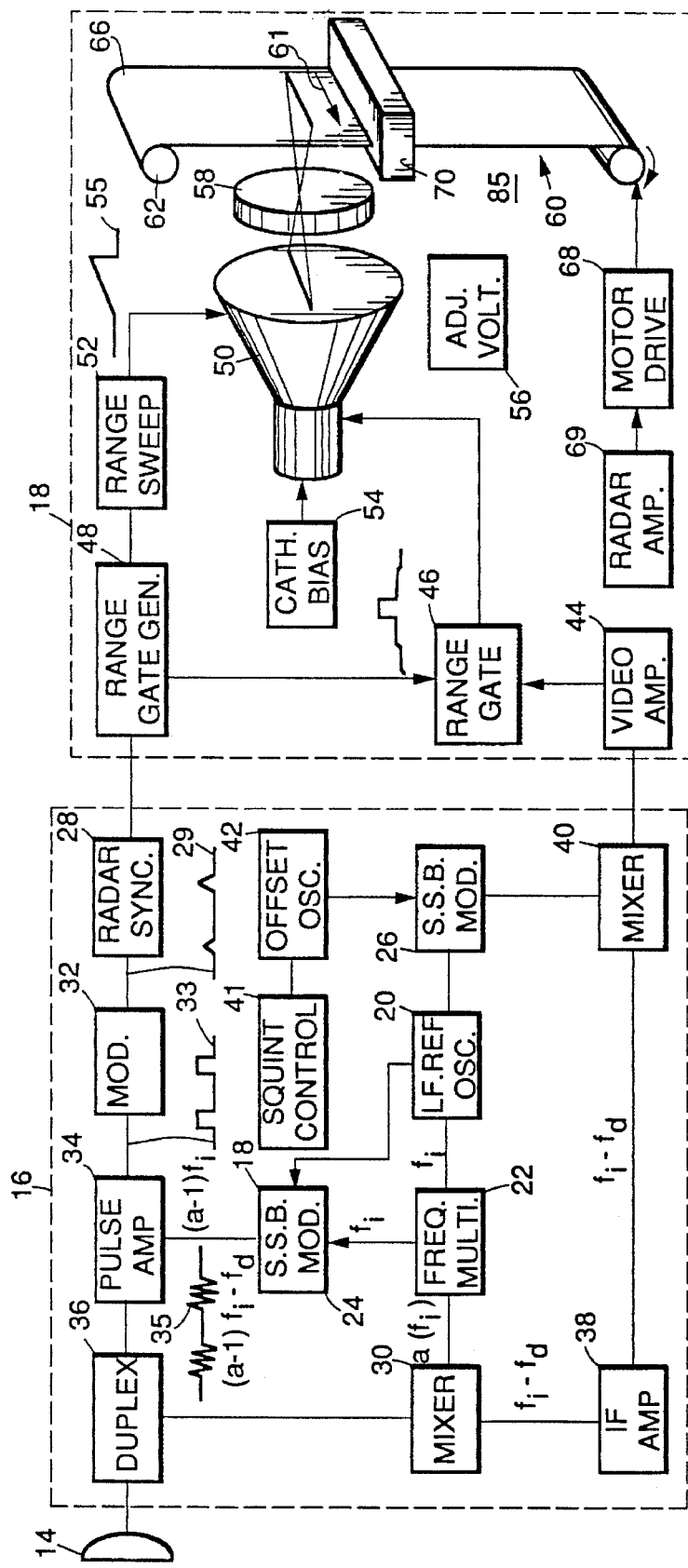
FIG. 2 is a schematic block diagram of a first portion of the synthetic array processing and mapping system showing the coherent radar system in accordance with the invention.

Referring now to FIG. 2, the coherent transmitter and receiver 16 includes a reference oscillator 20 for generating an IF signal at a frequency $f_o$ which is fed to a frequency multiplier 22 and to single side-band modulators 24 and 26. The output of the multiplier 22, at a frequency $a(f_o)$, in turn is coupled to a mixer 30 and to the modulator 24. An RF signal at a frequency $(a-1)f_o$ is thus available at the output of the modulator 24.

A radar synchronizer 28 is also provided in the transmitter-receiver 16 for developing timing pulses of a waveform 29. A pulse shaping network 32 squares the waveform 29, and this squared wave 33 is used to gate a pulse amplifier 34 to which the RF signal at the frequency $(a-1)f_o$ is continually coupled. The output of the pulse amplifier 34 is a pulsed RF carrier, shown in FIG. 2 as a waveform 35. This pulsed carrier is coupled to the antenna 14 through a duplexer 36 and radiated in a known direction into space relative to the aircraft or platform flight path and with a selected angle relative to the horizontal so as to be directed to the area being mapped or interrogated.

Radar return energy from those point reflectors or targets illuminated by the directional antenna 14 are fed through the duplexer 36 to the mixer 30 at a frequency which includes the RF carrier frequency $(a-1)f_i$ and a doppler shift frequency $f_d$. At the mixer 30, the output of the multiplier 22 at a frequency $a(fi)$ is heterodyned with the radar returns at the frequency $(a-1)f_i+f_d$ resulting in a signal at a frequency which is a combination of the IF signal frequency and the doppler shift frequency, namely, $f_i-f_d$. The output of the mixer 30, at the frequency $f_i-f_d$, may be amplified first at an amplifier 38 before being applied to a mixer 40.

The mixer 40 also receives another signal at a frequency formed from the frequency $f_i$ and a reference offset frequency $f_r$. The former $f_i$ frequency portion is supplied by the reference oscillator 20 and the latter $f_r$ frequency portion by an offset oscillator 42, both portions being combined by the single sideband modulator 26. The bipolar video output signal of the mixer 40, which may be at a frequency $f_r+f_d$, and the timing pulses from the synchronizer 28 comprise the output signals of the transmitter-receiver 16 that are coupled to the data recorder 18. The frequency offset is provided by the oscillator 42 so that the doppler history signals which are to be processed, do not pass through zero frequency at target positions adjacent to the boresight axis of the antenna 14. For operation with the real antenna pointed broadside to the flight path, the offset frequency may be a predetermined value. For operation with a squint angle, that is, with the antenna pointing at an angle $\Theta$ with respect to the perpendicular to the flight path, the offset oscillator 42 is controlled by a squint control system 41 responding to the aircraft velocity v and the squint angle $\Theta$. As a result, the tom provided by the squint angle operation is eliminated so that processing may be performed similar to that when the antenna is pointing broadside to the aircraft flight path, as will be explained subsequently in further detail.

A video amplifier 44 is provided in the data recorder 18 of FIG. 2 to amplify the bipolar video signal received from the mixer 40. This amplified video signal is applied through a range gate 46 to the beam intensity grid of a line scan record cathode ray tube 50, for example. A range gate generator 48 receives the synchronizing pulses of the waveform 29 from the radar synchronizer 28 and in response thereto actuates the range gate 46 during a finite time interval within each interpulse period as shown by a waveform 45. Only video signals applied to the range gate 46 during the time interval of the waveform 45, representing the range distance or swath width of an area being processed or mapped, are transmitted to the intensity grid of the record cathode ray tube 50. Conversely, video signals from targets other than those within the ranges which this time interval represents are rejected by the range gate 46.

A range sweep generator 52 is also provided for deflecting the electron beam of the record cathode ray tube 50 at the proper time and rate during each interpulse period as, for example, by a ramp input signal 55, when appropriately triggered by the range gate generator 48. For both a broadside and an off-broadside beam pointing direction of the antenna 14, the line scan parallels the arrow 61 in the range dimension. Voltage sources 54 and 56 are also provided for respectively controlling both the intensity and the position of the electron beam of the record scanning tube 50 as is well known in the art.

Figure 5:
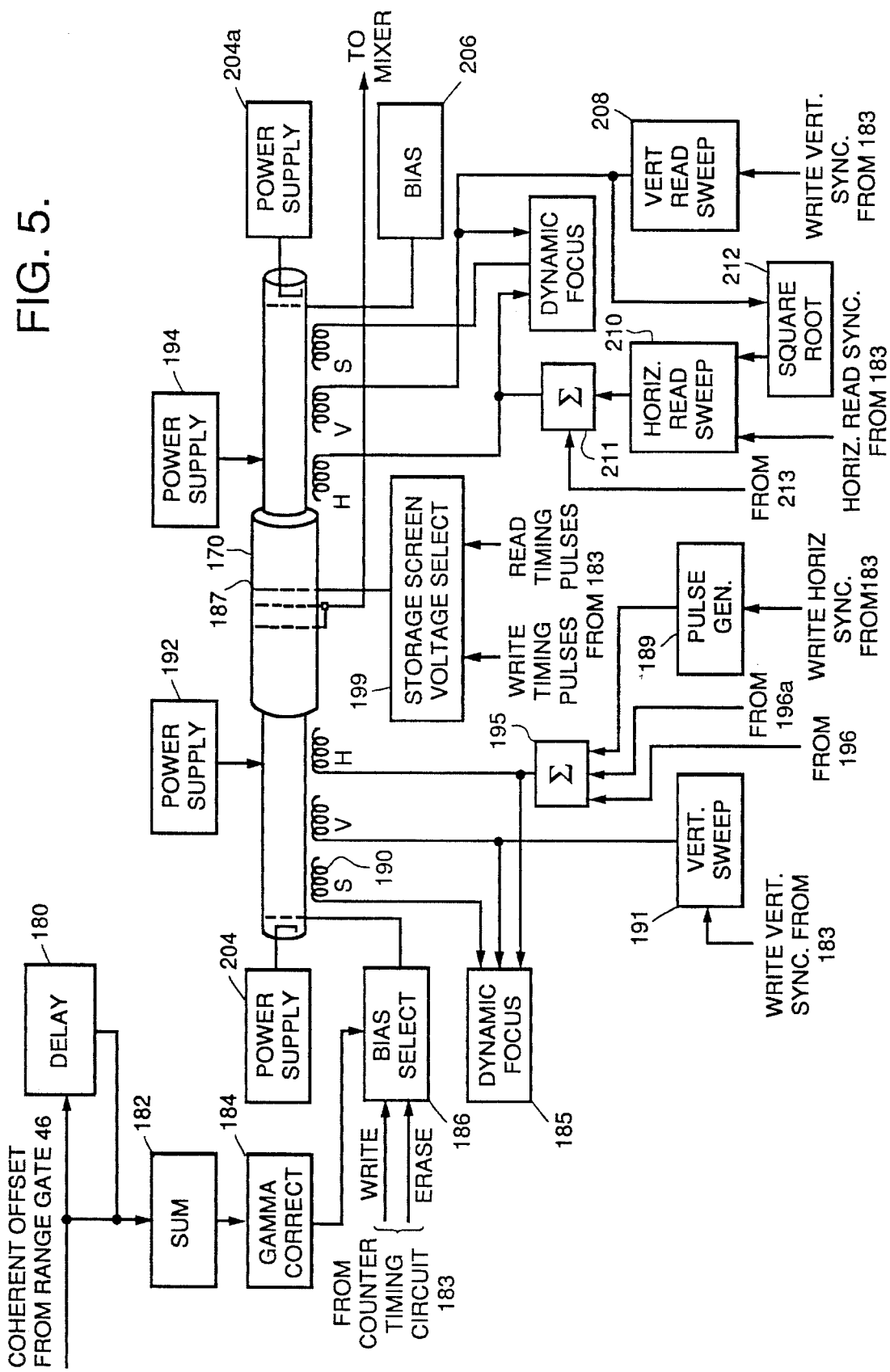
FIGS. 5 and 6 are schematic block and circuit diagrams of a storage tube arrangement that may be utilized in place of a film in accordance with the principles of the invention.

The data recorder 18 may include, in accordance with the invention, any suitable type of storage and scanning arrangement such as an arrangement utilizing a photographic film shown in FIG. 2 or a scanning storage tube as shown in FIG. 5. The data recorder 18 shown in FIG. 2 includes a film transport mechanism 60 having spaced apart film carrying cylinders 62 and 64. A motor drive 68 is coupled to the cylinder 64 to transport a strip of film 66 past the record cathode ray tube 50 so that the bipolar radar video may be light imaged onto the light sensitive film 66 through a lens system 58. A motor controller or radar motion adjust device 69 may be provided to control the speed of the film 66 as a function of the speed v of the aircraft or platform such as responding to a pitot tube system or to any measured or calculated speed. A velocity signal may be derived from an airspeed indicator (not shown) to control the circuit 69 and the motor 68 which may operate as a servo motor. For operation with the antenna 14 pointed at a squint angle $\Theta$, a voltage representative of the value of $\Theta$ is applied to the radar motion adjust circuit 69 and a signal is developed in the motor drive circuit 68 to provide a film speed of $v_f \cos \Theta$, as will be subsequently explained in further detail. A film processing unit 70 may also be provided to rapidly develop the film 66 directly after its exposure if continuous operation is utilized.

Figure 3:
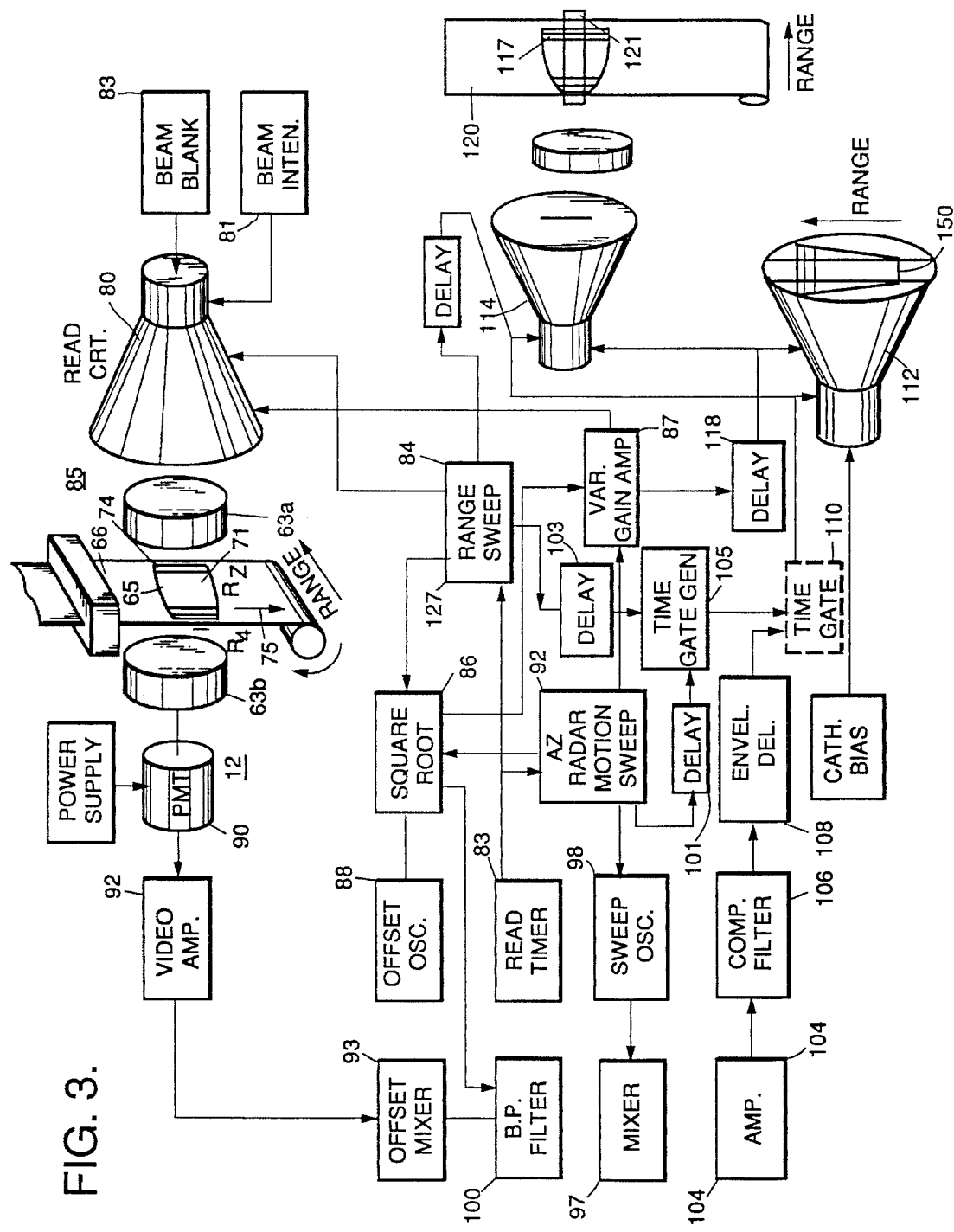
FIG. 3 is a schematic block diagram of a second portion of the synthetic array processing and mapping system of FIG. 2 utilizing non-linear readout and display rasters.

Referring now to FIG. 3, the stored and chemically developed doppler data is read from the storage device such as the film 66 with sweep lengths during each readout raster programmed to increase as a function of the square root of range, for example, as shown by range sweeps 72 and 74 of raster 65 at respective ranges $R_4$ and $R_2$ which may represent ranges approximately at the minimum and the maximum range of a swath area being observed or mapped. The data processor 12 includes a flying spot-scan-converter 85 having a read scanning cathode ray tube 80 mounted adjacent to and facing one side of the film 66 and a photo-multiplier tube 90 mounted on the other side of the film 66 preferably in axial alignment with the read cathode ray tube 80. Conventional type lenses 63a and 63b are provided for respective imaging and light condensing purposes. Voltage sources 81 and 83 are also provided for respectively controlling the beam intensity and the cathode bias of the read cathode ray tube 80.

The electron beam of the read cathode ray tube 80 is deflected in a longitudinal direction along the film strip 66 by an azimuth or radar motion sweep generator 82 and a variable gain amplifier 87 and is deflected in a transverse direction across the film strip 66 by a range sweep generator 84 in a raster fashion, thus forming the reading frames or rasters such as 65. The radar motion sweep generator 82 sweeps the beam along the doppler history at each range position and the range sweep generator 84 changes the range position of the azimuth sweep lines. A read timing circuit 83 controls the time relation of the radar motion and range sweeps and may include conventional digital counters or dividers and appropriate logic gates as are well known in the art. A square root generator 86 translates the center frequency of the doppler history signals by varying the frequency of an offset oscillator 88 as a function of the square root of range so that a focusing oscillator with a constant center frequency can be utilized in accordance with the invention. The square root circuit 86 may be any conventional analog function generator such as a triode tube having a diode coupled to its cathode. The variable gain amplifier 87 which controls the lengths of the azimuth or radar motion sweeps as a function of the square root of range may be any conventional circuit such as a 6AR8 deflection tube having the azimuth sweep applied to the deflection plates and a square root function signal applied to a control grid from the circuit 86. The azimuth sweep signal may be extracted from the anode of the tube and will have a waveform varying in slope around a center time position of the line sweep intervals.

That energy, emanating from the scanning beam of the read cathode ray tube 80 and penetrating through the film 66 in the form of intensity modulated light, which is received by the photomultlplier tube 90 is thereupon verted to an analogous voltage representative of the doppler histories, or information signals, stored on the film 66 over the scanning time interval for the particular range element scanned. This scanning process is repeated in sequence for each of the range elements forming the reading frame 65. Successive reading rasters or frames as the film 66 is advanced in the direction of the arrow 75, are similarly scanned.

The doppler history or information signals from the photomultiplier tube 90 are then fed to a video amplifier 92 and hence to an offset or translation mixer 93 which also receives the frequency varying signal from the voltage controlled offset or translation oscillator 88. The square root function circuit 86 responds to the range sweep generator 84 and the radar motion sweep generator 82 to develop a voltage to control the frequency of the offset oscillator 88 to decrease as a function of the square root of range, for example. Thus the frequency of the offset oscillator 88 is substantially constant during each range sweep but decreases at each increasing range sweep line. By varying the readout raster width proportional to the square root of range, all doppler history signals have a constant slope but the center frequency increases with each range sweep of increased range. The offset oscillator 88 thus repositions in frequency the readout doppler histories to compensate for the offset change due to the readout raster line length change, which simplifies subsequent processing and maintains a relatively small bandwidth. It is to be noted that in another arrangement in accordance with the principles of the invention (FIG. 4) a raster is utilized with constant length sweeps and the swept oscillator is varied in slope to provide the constant slope doppler history signals for processing.

It should be pointed out that when the side-looking antenna 14 of FIGS. 1 and 2 is squinted forwardly or rearwardly from the side-looking or broadside position, the readout raster 65 and the variable gain amplifier 87 may be similar to that of the broadside arrangement.

The signal formed of doppler histories at constant center frequency is applied from the mixer 93 to a bandpass filter 100 which responds to the $\sqrt{R}$ circuit 86 so that the passband width increases with the $\sqrt{R}$. Because of the increased velocity of the readout spot at increased range, the array has a greater bandwidth. The filter 100 passes the signals in the spectral region of the doppler frequency excursion while eliminating undesired noise and return signals. The filter 100 may be any conventional type such as one utilizing the variable capacitance parameter of a voltage controlled varactor diode.

The signal passed through the filter 100 is applied to a focusing mixer 97 that is controlled by a swept oscillator 98 which sweeps in frequency over each line sweep or range interval. In the arrangement of FIG. 3, the sweep oscillator 98 which is a voltage controlled oscillator, is controlled by the sweep of the radar motion sweep generator 82. The output signal of the mixer 97 includes the sum frequency between the doppler history signal of each point resolution element in space and the reference frequency signal developed by the sweep oscillator 98, the sum frequency increasing with time during each readout line.

In the illustrated arrangement, the sum frequency is utilized from the offset or translation oscillator and the sum frequency is utilized from the mixer 97. However, it is to be understood that any desired products may be utilized, that is, either the sum or difference frequencies may be utilized from the mixers 93 and 97 in any combination, in accordance with the principles of the invention. When the difference frequency product is utilized from the mixer 97, a bandwidth reduction is provided which reduces the required compression ratio of the subsequent compression filter.

The doppler history signals, each having a different frequency displacement as a result of the different time displacement along the flight path, are applied through an amplifier 104 to a compression filter or a frequency dispersive delay line 106 which may have a linear or a substantially linear frequency-versus-time characteristic. The slope of the signal developed by the sweep oscillator 98 is adjusted so that the frequency-versus-time characteristic of the doppler sum (or difference) signal at the output of the mixer 97 substantially matches the frequency-versus-time characteristic of the filter 106. Thus the linear frequency modulated bursts applied to the filter 106 from particular targets or resolution points will be compressed into very short output pulses with amplitudes proportional to the integral of the input burst or signal. The amplitude of the output pulse is dependent upon the reflectivity of a point or resolution element on the earth's surface, for example, to provide an accurate map or picture of the area being mapped. Also the amplitude of different portions of each doppler history signal is dependent upon the angle of the return energy relative to the axis of the antenna. The timing of the compression filter output pulse will depend upon the time displacement of the readout signal relative to the readout sweep beginning. A target whose doppler signal reaches the value to be correlated later in the line readout excurses over a different frequency segment with the same slope at the input of the filter 106. The filter 106, in combination with the delay encountered along the readout line, causes the targets to appear at the Output lead of the filter in time sequence corresponding to their position along the flight path. Because the readout raster width is varied proportional to the square root of range, time displacement of the signals at the output of the compression filter is range dependent, which condition is corrected by the display raster. Each doppler history signal at a particular range is filtered with the bandpass filter at the input of the mixer 97 to develop identical frequency excursions. Corresponding doppler history signals of the plurality of azimuth sweeps effectively represent a single synthetic beam in space although the width of the synthetic beam is range dependent as will be subsequently explained in further detail. The filter 106 develops different time compressed pulses from the doppler history signals so that a displaced phase center array of beams is effectively formed, that is, each beam has a different transmission phase center. The time compressed signals developed by the filter 106 are envelope detected in an envelope detector 108. In order to eliminate the additional arrays read out beyond the extremes of the displaced phase center array of beams, a time gate 110, shown dotted, may be provided between the envelope detector and the intensity grid of the display devices. Also masks such as 119 and 121 may be utilized at the display surface instead of the time gate 110. When time gating is utilized, a time gate generator 105 may respond to delayed azimuth sweeps and delayed range sweeps of respective delay lines 101 and 103 to form gating pulses, the delays being required to compensate for the inherent delay in the compression filter 106 and the time offset of the pulses during each azimuth sweep resulting from the pulse integration and compression.

During each readout sweep, or a predetermined period thereafter because of the inherent delay of the compression filter 106, the detected signals are applied from the envelope detector 108 or from the gate 110 to the intensity control grid of a display cathode ray tube 112 for a continual display. Also the detected signals may be applied to the intensity control grid of a flying spot scanner tube 114 for forming a map. At the same time, the electron beam of the tube or tubes is deflected horizontally depicted by an arrow 115, to correspond to the exact timing or equivalent azimuth position of the synthetic beam. The variable width sweep utilized for the read-out raster is applied from the variable gain amplifier 87 through a delay line 118 to control the azimuth or radar motion deflection of the beams. In the range coordinate, the display electron beams are swept by the range sweep applied from the range swoon generator 84 through a delay line 107 to the range deflection plates of the tubes 112 and 114. A source of energy 118a is also provided to control the cathode bias of the display cathode ray tube 112. The flying spot scanner tube 114 is also controlled by a cathode bias (not shown) and a map is formed on a film 120 as it moves longitudinally at a speed proportional to the velocity of the aircraft from the motion adjust circuit 69 (FIG. 2) as rasters such as 117 are formed. The film 120 may be either continuously developed or developed at a later time. Also in accordance with the invention, the detected signals and the azimuth and range timing signals may be transmitted by conventional coding arrangements to remote stations, for example. The square root of range function rasters such as 113 and 117 are developed on the respective tube 112 and film 120 so that resolution elements are equally separated in azimuth at all ranges on the display. As previously discussed, the masks 119 and 121 may be utilized instead of the time gate 110 to maintain a constant number of point reflectors being recorded during each azimuth sweep, independent of range.

Figure 4:
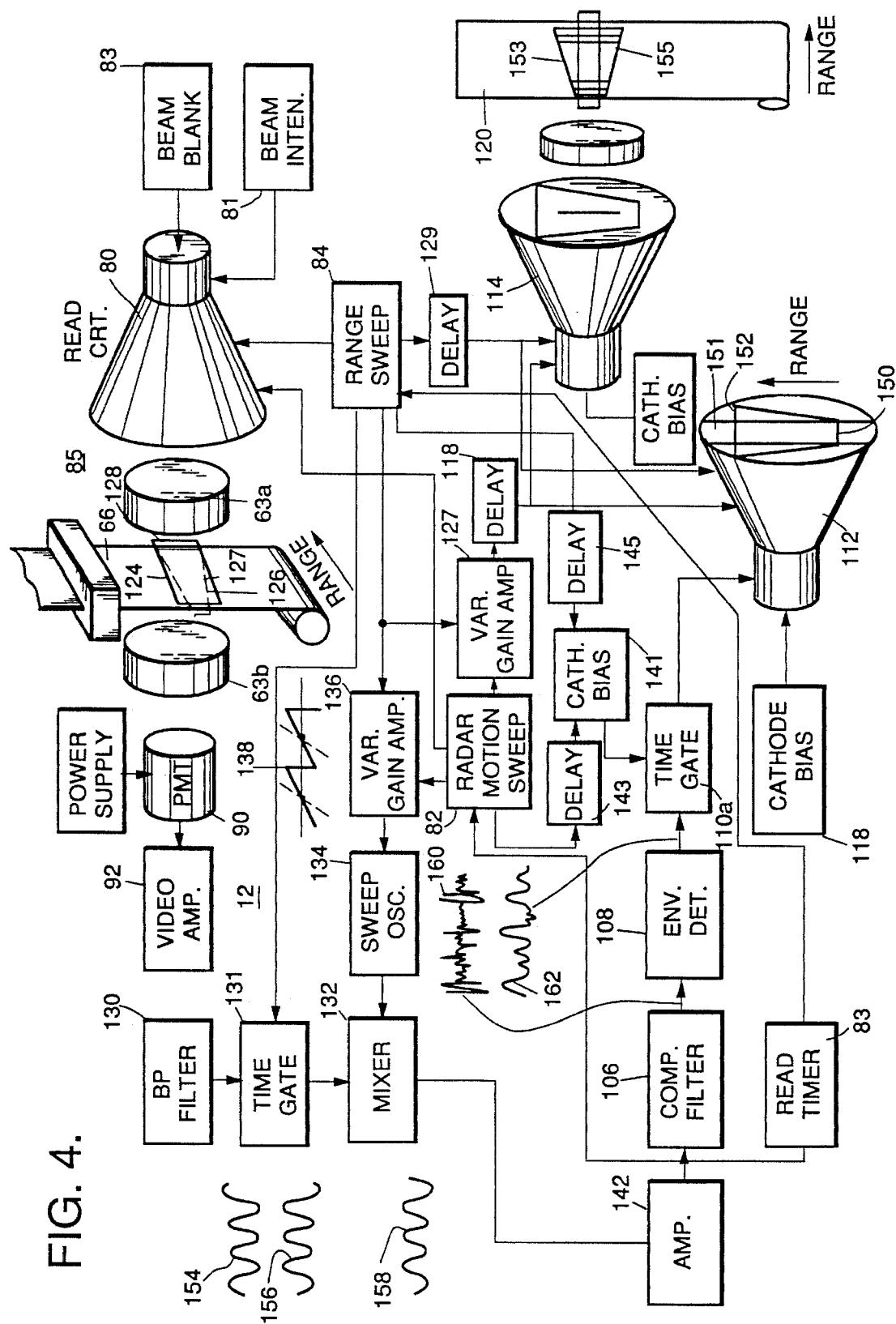
FIG. 4 is a schematic block diagram of another processing system having a linear readout raster in accordance with the principles of the invention.

In an alternate implementation of FIG. 4, a processor is shown in which a variable slope swept oscillator is utilized along with a constant speed or linear readout raster, that is, a raster of rectangular or square dimensions, in accordance with the principles of the invention. A readout raster 124 has equal range sweep lengths at each range $R_4$ and $R_2$ such as shown by respective lines 126 and 128. The radar motion sweep generator 82 applies ramp signals to the tube 80 of equal slope so that each beam deflection is of equal velocity as it sweeps along the film 66. The range sweep generator 84 applies range sweeps to the tube 80 controlled by the timing circuit 83 to have a fixed time relation to the azimuth sweeps which in turn are a function of the aircraft velocity and of the radar pulse repetition frequency which may be constant in some systems in accordance with the invention. The doppler history signals sensed by the photomultiplier tube 90 are applied through the video amplifier 92 and through a bandpass filter 130 to a time gate 131 shown dotted, which may be utilized to eliminate undesired additional arrays read out at shorter ranges. The periods during which signals are passed through the time gate 131 may decrease in width as a function of range in response to the range sweep generator 84 at repetitive intervals as controlled by the radar motion sweep generator 82. A trapezoidal shaped mask 127 may be utilized at the film 66 instead of the time gate 131. The signal is applied from the time gate 131 or from the filter 130 to a focusing mixer 132 controlled by a focusing sweep oscillator 134. A variable gain amplifier 136 responds to the radar motion sweep generator 82, which sweeps at each range are varied in slope as a function of range as provided by the ramp signal from the range sweep generator 84. As shown by a waveform 138, the frequency-versus-time slope of the frequency varying signal developed by the sweep oscillator 134 increases with range so that the doppler history signals at the output of the mixer 132 have a constant slope. The doppler history signals from points at different flight path positions at the input and output of the mixer 152 are displaced In time over each readout line scan period. The variable gain amplifier 136 may be any conventional circuit such as discussed relative to the variable gain amplifier 87 of FIG. 3. It is to be noted that in the arrangement of FIG. 4 utilizing a linear readout raster, the center frequencies of all the doppler history signals at the input to the mixer 132 are substantially the An amplifier 142 applies the varying frequency signals to the compression filter or dispersive delay line 106. The compressed pulses are applied to the envelope detector 108 and through a time gate 110a to the intensity grid of the display tube 112 or to the scan tube 114 of a mapping unit similar to that of FIG. 3. The tubes 112 and 114 are trolled by a delayed sweep from the range sweep generator 84 and a delayed motion sweep. The motion sweep is applied from the motion sweep generator 82 through a variable gain amplifier 127 and a delay line 118 to the tubes 112 and 114. The variable gain amplifier 127 is controlled by the range sweep to vary in slope so that trapezoidal shaped rasters 152 and 155 are developed. The delay line 118 corrects for the delay in the compression filter 106 and a delay line 129 delays the range sweep to correspond to the period that the pulses of the raster are applied to the intensity grids of the tubes 112 and 114. Thus the length of horizontal lines in the azimuth or radar motion dimension such as lines 150 and 152 vary as a function of range that resolution elements or point reflectors are equally separated in azimuth at all ranges on the display or sweep.

Because the time separation at the output of the filter 106 between equally spaced point reflectors varies inversely with range, the speed of the radar motion sweep is varied directly with range to provide equal distance spacing of such reflectors on the final display surface. Thus to gate out additional array responses, the time gate 110a may be utilized coupled to a time gate generator 141 controlled by sweeps from the motion sweep generator 82 and the range sweep generator 84 applied through respective delay lines 143 and 145. The width of the time gate period varies inversely with range. Instead of utilizing the time gate 110, masks 151 and 153 may be provided respectively at the face of the tube 112 and adjacent to the film 120, that is, between the tube 114 and the film 120.

In operation, the raw data of doppler history signals, one being represented by a waveform 154 is applied to the mixer 132 along with the swept oscillator signal of a waveform 156 to develop a frequency varying signal of a waveform 158. The dispersive delay line or compression filter 106 responds to the variable frequency signals such as that of the waveform 158, each signal being at a different center frequency over each azimuth readout line, to develop integrated and compressed pulses of a waveform 160. Each pulse of the waveform 160 represents a doppler history and a point target resolution element. Thus, the doppler signal of the waveform 158 may represent a single point reflector, a selected number of similar signals being read from the film 66 during each azimuth line scan. The envelope detected signals of a waveform 162 are then applied to the intensity grid of the tube 112 which has its beam deflected in range and azimuth to correspond in information position to the ground azimuth and range.

Figure 6:
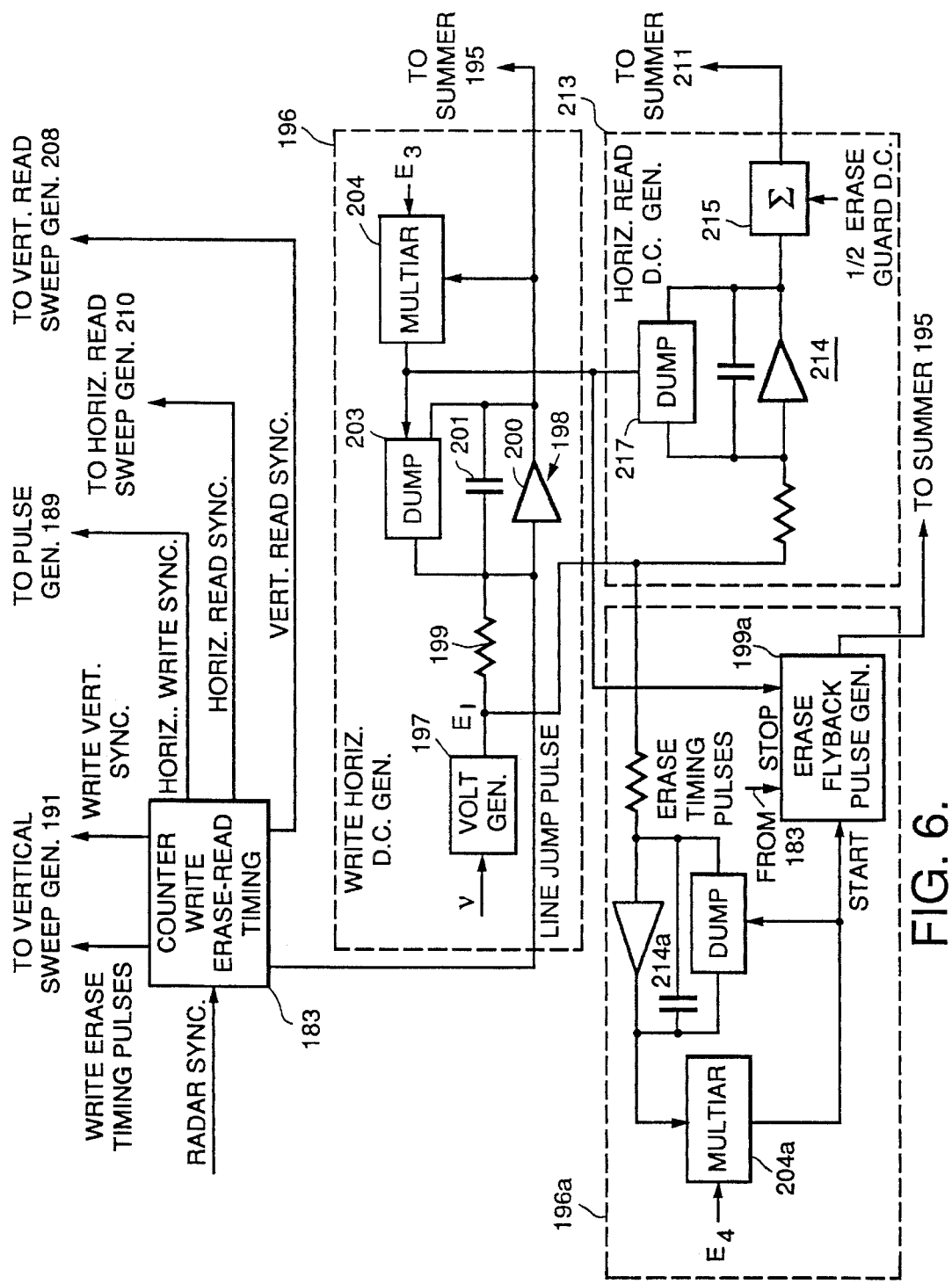

Referring now to FIGS. 5 and 6, an arrangement is shown in accordance with the invention for storing the raw data in a scan converter tube 170 instead of on a film unit 85 of FIGS. 2, 3 and 4. It is to be understood that the scope of the invention utilizing either the $\sqrt{R}$ scan or the linear scan is not limited to any particular storage device or display device but includes all suitable arrangements. The tube 170 may be any conventional type of tube such as a type CK7702. The coherent offset video signals are applied from the range gate 46 (FIG. 2) both through a delay line 180 and directly to a summing circuit 182 so that the scan converter tube 170 stores two redundant sets of raw data. The delay line 180 delay the slightly more than the range gate swath interval. The signal is then applied to a gamma correction circuit as is well known in the art, and through a bias select circuit 186 to the write or record intensity grid of the tube 170. The bias select circuit 186 responds to and erase timing pulses derived from a counter timing circuit 183 which in response to the radar synchronizing pulse develops both writing and reading timing and synchronizing pulses for the system. As is well known in the art, the timing circuit 183 may include a clock, a plurality of serially connected counters and necessary logical gates. Dynamic focusing for writing is provided by a focus coil 190 responding to a write dynamic focus circuit 185 which in turn receives horizontal write and vertical write sweep waveforms. For writing or recording on a storage screen 187, a vertical sweep generator 191 responds to write vertical synchronizing pulses from the timing circuit 183 to apply vertical sweeps to a vertical deflection yoke to define the vertical or range traces of each raster. The horizontal write or azimuth deflection signal decreases in DC level across one half of the width of the tube screen, as an illustrated example, changes levels to control writing alternately on the left and the right half of the screen and changes levels to perform erasing alternately on both sides of the read raster with an offset of a selected number of vertical lines. A pulse generator 189 responds to a write horizontal synchronizing pulse from the circuit 183 to apply pulses of alternate polarity to a summing circuit 195 defining positions alternately on the left and right half of the tube storage surface. A write horizontal DC generator 196 applies a decreasing DC voltage with a selected 5 line offset for erasing, to the summing circuit 195. In order to maintain a constant equivalent ground distance recorded in the radar motion dimension, the velocity of each recording across the total width of the tube is controlled as a function of aircraft velocity v by a voltage generator 197 which develops a voltage $E_1$. An integrator 198 responds to the voltage $E_1$ and includes a resistor 199 coupled through an amplifier 200 to the summing circuit 195. A capacitor 201 and a dumping circuit 203 are coupled in parallel across the amplifier 200. A line Jump pulse is applied from the counting circuit 183 to the input of the amplifier 200 for changing the charge on the capacitor 201 during erasing and recording. To dump the capacitor 201 at the end of recording across the tube surface, a multiar circuit 204 responds to a predetermined voltage $E_3$ to close a gate in the dump circuit 203 and discharge the capacitor. When the voltage at the output lead of the amplifier 200 falls to a predetermined level, the multiar fires to apply a narrow pulse to the dumping circuit 202. At the same time, the multiar is reset as is well known in the art. Thus, the horizontal write deflection signal is applied to the horizontal write deflection yoke of the tube 170. A circuit 196a is provided similar to the circuit 196 and including an erase flyback pulse generator 199a for providing signals to the summer 195 during selected erase time periods to control the erase band when a new recording is started on the surface of the tube 170. An integrator 214a responds to the voltage $E_1$ to control a multiar 204a and establish the time of starting of a pulse by the generator 199a which pulse is terminated by the multiar circuit 204. The multiar circuit 204a also responds to a predetermined voltage $E_4$ which determines the firing level thereof.

A storage screen voltage select circuit 199 changes the potential from +300 to +20 volts, for example, on the storage screen 187 in response to respective write timing pulses and erase timing pulses supplied from the timing circuit 183. Power supplies 192 and 194 control the various grids in the tube and power supplies 204 and 204a supply the proper potentials to the cathodes of the tube. A bias circuit 206 maintains a predetermined potential at the intensity grid of the read end of the tube 170.

Reading is performed at the opposite end of the tube 170 simultaneously with the recording operation and with a predetermined time relation and storage screen scan position as determined by the timing circuit 183. A vertical read sweep generator 208 responds to a vertical read synchronizing pulse from the timing circuit 183 to define the bottom and top of each readout raster. A horizontal read sweep generator 210 responds to a horizontal read synchronizing pulse from the timing circuit 183 to apply horizontal sweep signals to a summing circuit 211. When operating with the $\sqrt{R}$ readout raster of FIG. 3, a square root circuit 212 responds to the vertical read sweep voltage to vary the length of the horizontal sweep signals as a function of the square root of range. A horizontal read DC generator 213 develops a decreasing DC signal during the period that each of the plurality of readout rasters are being from the left side to the right side of the tube surface, which signal is applied to the summing circuit 211. An integrator 214 receives the voltage $E_1$ proportional to aircraft velocity from the voltage generator 197 and a dumping circuit 217 receives a dumping pulse from the multiar 204. A summing circuit 215 responds to the voltage developed by the integrator 214 and a DC voltage which has a value equal to one-half of the erase line offset voltage which may be developed by a suitable biasing circuit in the timing circuit 183. Thus the DC voltage developed by the generator 213 is reset in response to the multiar circuit 204 after the read out raster ham moved from the left side to the right side of the tube surface.

Figure 7:
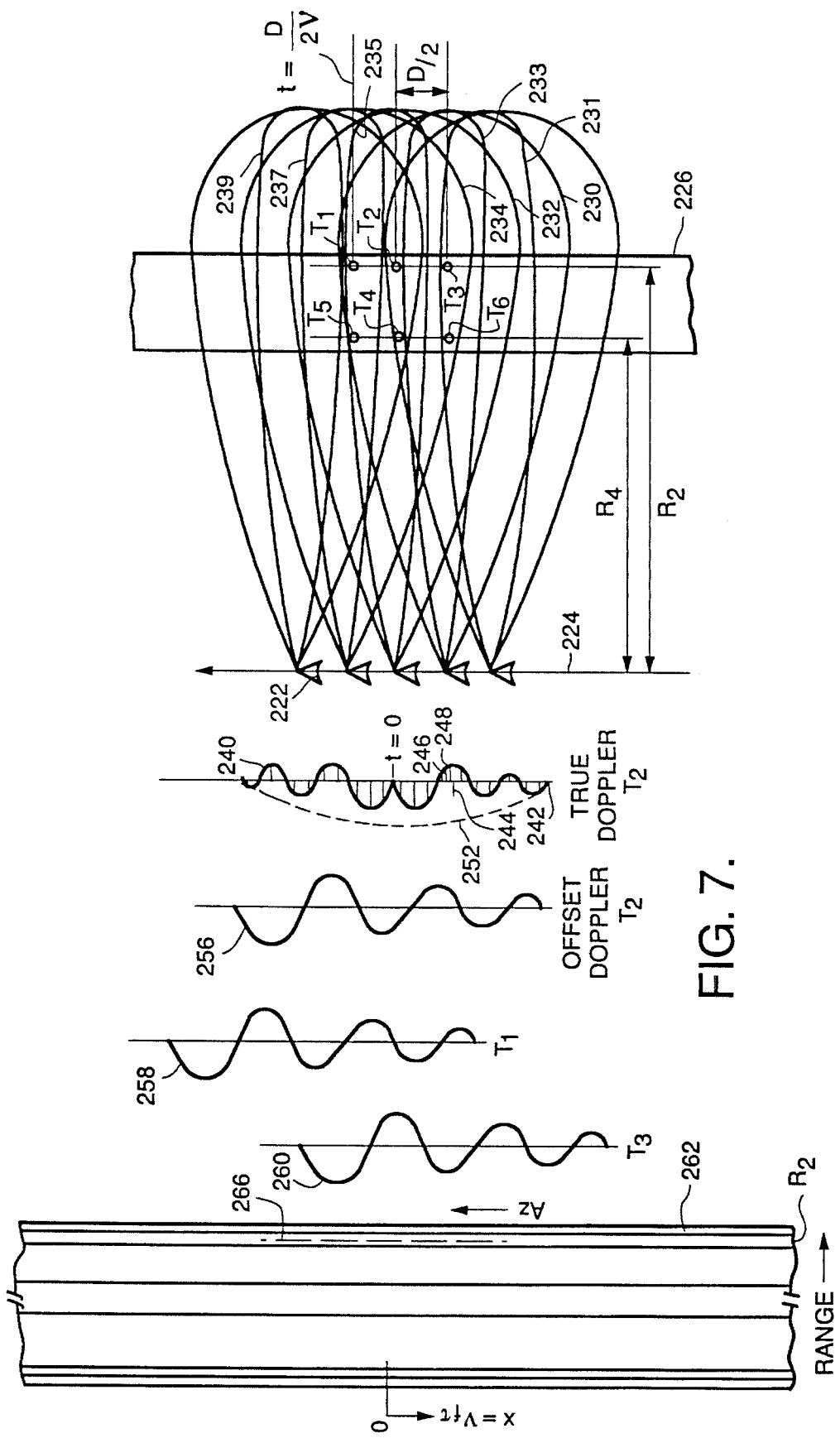
FIG. 7 is a schematic diagram for explaining the synthetic array and beam forming sequence in accordance with the invention.

Referring now to FIG. 7, an aircraft 222 flies along a flight path 224 transmitting pulses of energy from the antenna 14 positioned at a selected angle below the horizontal to illuminate the ground or earth's surface including a mapped strip 226 as defined by the range gate (FIG. 2). The position of the craft 222 at any instant of time is vt from a time t=0 point where v is the air-craft velocity. For the purposes of explanation it assumed that straight line flight is maintained by the aircraft although motion compensation systems utilized to correct for variations in the flight path in accordance with the principles of the invention. The pulse repetition frequency is selected so that the real antenna beam patterns such as 230, 232 and 234 are over-lapping to repetitively receive reflected energy from point targets or objects such as $T_1$, $T_2$, $T_3$, $T_4$, $T_5$ and $T_6$. The spacing between point reflectors or targets such as $T_1$ and $T_2$ and targets $T_2$ and $T_3$ at a range $R_2$ as well as between adjacent point reflectors at all ranges is the predetermined resolution distance of the system D/2 where D is the 3 db (decibel) width of the synthetic beam effectively formed by the system of the invention at a selected range. It is to be noted that the selected resolution distance is constant at all ranges so that the synthetic beam width is made smaller at greater ranges. Positioned in corresponding real beams are parallel synthetic beams 233, 235, 237 and 239 which in the system of the invention are simultaneously formed in parallel by reading out substantially more than one synthetic array length during each azimuth sweep. Because in the illustrated system, three doppler histories are read out during each azimuth scan, three beams such as 233, 235 and 237 are simultaneously formed over the period of a readout raster. Three adjacent beams are formed further along the flight path during the period of each subsequent readout so that new groups of parallel beams are effectively formed along the flight path. For purposes of explanation, the targets $T_4$ and $T_2$ are assumed to be centered on the real antenna beam pattern 232 which has its center line positioned on the targets $T_4$ and $T_2$ at time t=0 and flight distance vt=0. The ranges $R_4$ and $R_2$ may be substantially at respective minimum and maximum range of the mapped strip 226 for purposes of explanation. An accumulated true doppler signal of a waveform 240, assuming the absence of an offset frequency correction, represents one of the doppler history signals of a single point target $T_2$ developed during a single range sweep after storage and during scanning of the film. As the vehicle 222 progresses along the flight path 224 a particular echo element such as $T_2$ approaches the perpendicular to the velocity vector and its phase rotation rate or doppler shift decreases, reaching zero at the perpendicular which is the shortest path to that point. This changing phase rotation rate of a given echo is the doppler frequency history of the corresponding point. Thus the doppler history of each echo element (assuming that the offset correction is not provided in the radar) is approximately a linear chirp-like or FM signal, beginning with an initial doppler component of several hundred cycles, decreasing in frequency to zero, and then rising again in frequency as the perpendicular is passed. It is this raw data of the waveform 240, except offset in frequency, containing both the phase and amplitude history of each echo point that is stored for subsequent signal processing, that is, vector alignment and summation. The transmission positions or times are repetitive such as at positions 242 and 224. It is to be noted that although a plurality of transmission times may occur between time positions 242 and 244 with corresponding real beams, they are omitted for convenience of illustration. After each transmission, return vectors are received at all ranges over the illuminated azimuth area such as shown by vectors 246 and 248 for the respective points $T_4$ and $T_2$. The accumulated real antenna pattern is indicated by a curve 252 which varies along the flight distance during which the target $T_2$ is illuminated.

To facilitate subsequent processing of the stored raw data, an offset frequency is provided in the transmitter coherent frequency reference by the offset oscillator 42 (FIG. 2) against which all return signals are phase detected before storage. This frequency offset may be generally in the order of several hundred cycles so that the recorded echoes do not reach zero frequency in a region of the real antenna pattern which has appreciable relative gain, as may be determined by acceptable levels of folded power spectrum. A waveform 256 shows the offset doppler signal for the target $T_2$ as applied to the film or tube for storage. Waveforms 258 and 260 respectively show the accumulated offset doppler history for points $T_1$ and $T_3$ which are respectively later and earlier in time along the flight path than the doppler history of the waveform It is to be noted that a plurality of doppler history signals such as shown by the waveforms 256, 258 and 260 may be read during each azimuth line scan at each range interval.

To accomplish raw data storage on film 262, for example, the bipolar coherent video signal is applied from the mixer 40 (FIG. 2) as intensity modulation to the flying spot scanner cathode ray tube 50. The bias of the tube is adjusted so that zero signal level results in mid level film exposure to accomodate both positive and negative polarity pulses. The doppler history traces 266 representing the doppler history 256 after the film is developed may store only the envelope of the signal because of the resolution characteristics of the film (or the storage tube). Other stored doppler histories such as shown by the waveforms 258 and 260 from respective targets $T_1$ and $T_3$ are superimposed on the film 262 at the range position $R_2$ to be read out during scanning of a raster, for example, the readout being simultaneous for certain portions of the histories depending upon their extent in time, the width of the readout raster and the position of the raster on the film. The film 262 may be considered to move from a 0 distance position to a distance $X = v_f t$ at any instant of time where $v_f$ is the film velocity. The film is shown to move in a relative direction opposite to the flight path as the position of the developed rasters is stationary.

To further explain the system operation, the envelope of the bipolar video pulse train for point reflectors $T_2$ $T_4$ and $T_1$ as received by the real antenna may be expressed as follows:

$$e_2(t) = A_2 \cos 2\pi \left( f_o t - \frac{v^2 t^2}{R_2 \lambda} \right)$$

$$e_4(t) = A_4 \cos 2\pi \left( f_o t - \frac{v^2 t^2}{R_4 \lambda} \right)$$

$$e_1(t) = A_1 \cos 2\pi \left[ f_o \left( t - \frac{D}{2v} \right) - v^2 \frac{\left( t - \frac{D}{2v} \right)^2}{R_2 \lambda} \right]$$

where A is the amplitude which is a function of the reflectivity of the point reflector, $f_o$ is the offset frequency, t is the time position along the flight path, and $\lambda$ is the wavelength of the transmitted energy. It is to be noted that the term $v^2 t^2 / R_2 \lambda$ represents the linear frequency change or slope of the doppler history signals which is a function of range.

Figure 8:
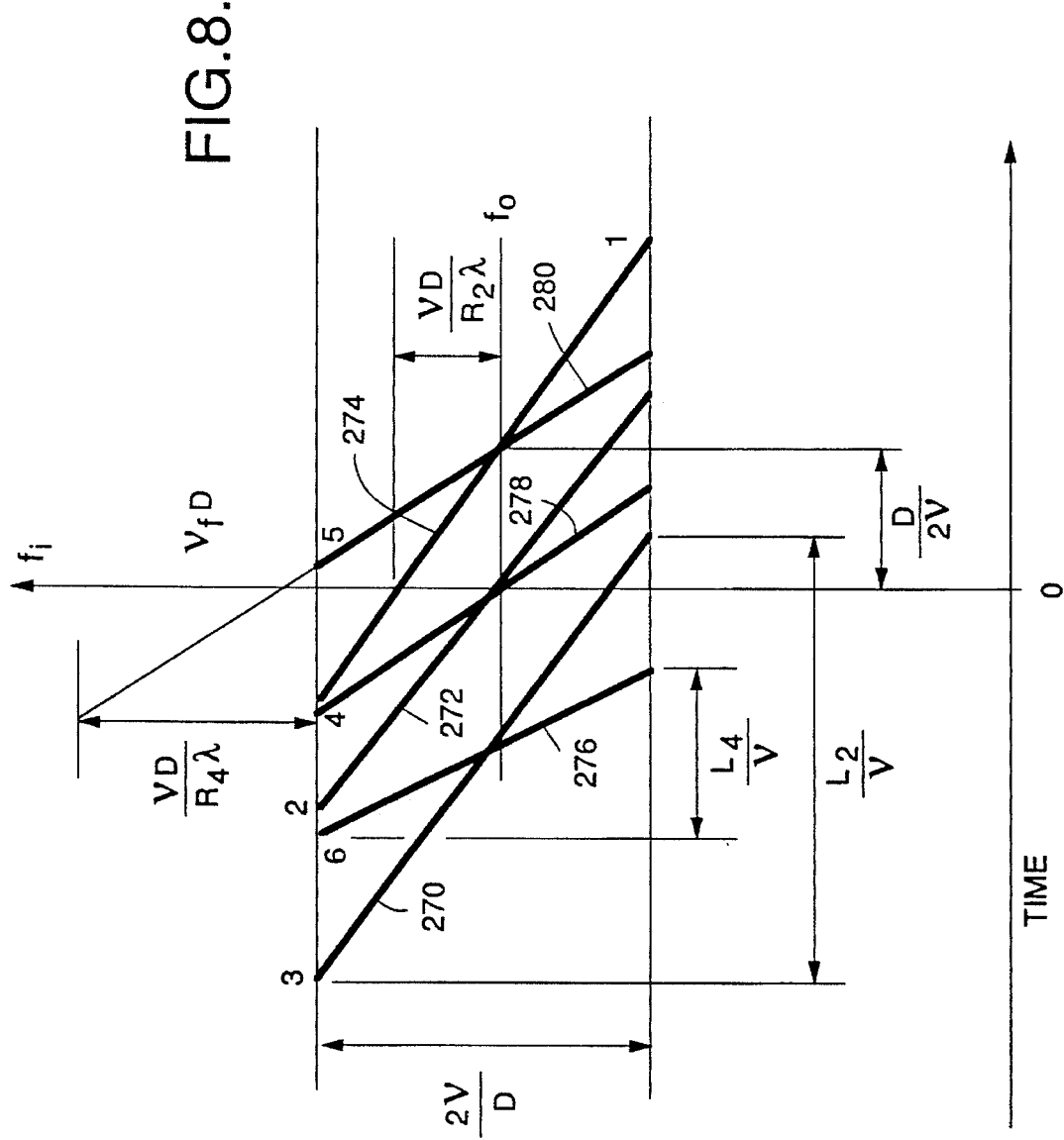
FIG. 8 is a graph of instantaneous frequency as a function of time for explaining the doppler history signals received by the radar system from point targets.

Referring now to FIG. 8, the instantaneous frequencies fi are shown developed by the radar system in real time for point targets at ranges $R_2$ and $R_4$. Plots 270, 272 and 274 respectively represent the doppler history signals received from point reflectors $T_3$, $T_2$ and $T_1$ which are spaced azimuth resolution distance apart. At a lesser range $R_4$, curves 276, 278 and 280 represent the instantaneous frequencies of signals received from respective point reflectors $T_6$, $T_4$ and $T_5$, also spaced one resolution distance apart. Because of the shorter distance required to be travelled by the aircraft at shorter ranges for receiving each complete doppler history, the frequency-versus-time slope of the doppler history signal is substantially greater than at a farther range. The total frequency excursion of interest of the doppler history signals is 2v/D at all ranges. The time duration of the signals such as 276 and 272 respectively at shorter and farther range are $L_4/v$ and $L_2/v$ where L is the synthetic array length $L_4=R_4\lambda/D$ and $L_2=R_2\lambda/D$. Thus the time duration of each array length or doppler history duration is directly proportional to the range of the corresponding point reflector. The time spacing between doppler histories of adjacent point reflectors at all ranges is D/2v. The frequency spacings of the adjacent signals at each of the ranges $R_4$ and $R_2$ are respectively $vD/R_{4\lambda}$ and $vD/R_{2\lambda}$ thus being inversely proportional to range. The following expressions represent the instantaneous frequencies $f_i$ received by the real antenna for point reflectors $T_2$, $T_4$ and $T_1$ where $f_i$ is represented by $$\frac{1}{2\pi} \cdot \frac{d}{dt}$$

of the argument of $\cos \phi(t)$.

$$f_{i2} = f_o - \frac{2v^2}{R_2\lambda} t$$

$$f_{i4} = f_o - \frac{2v^2}{R_4\lambda} t$$

$$f_{i1} = f_o - \frac{2v^2}{R_2\lambda} \left( t - \frac{D}{2v} \right).$$

Figure 9:
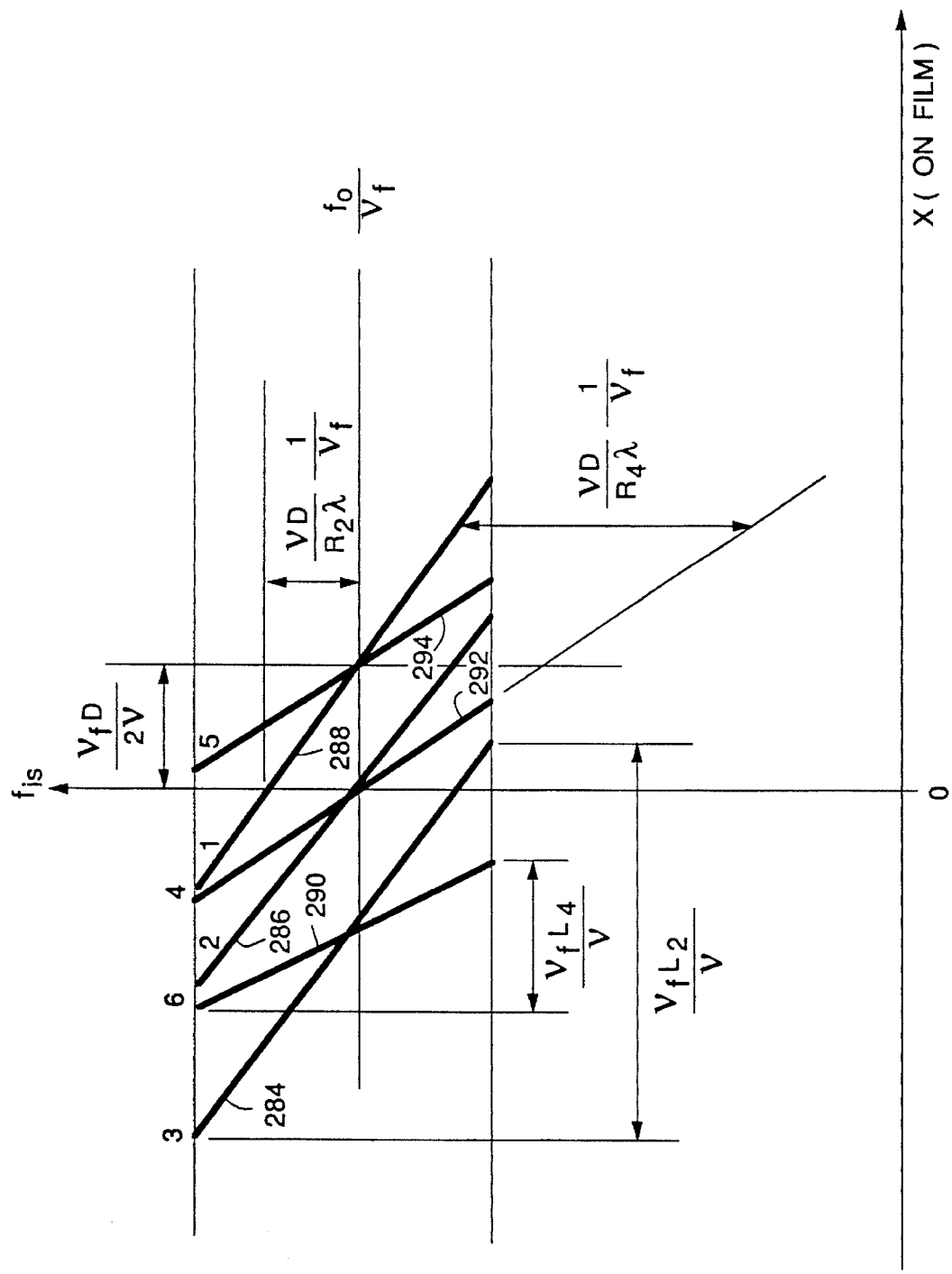
FIG. 9 is a graph of instantaneous frequency as a function of distance on the recording medium for explaining the characteristics of the recorded doppler history signals.

Referring now to FIG. 9 as well as to FIG. 7, the envelope functions e'(X) recorded on the storage film will be explained. The function e'(X) may be considered to be orthogonal to the surface of the film.

$$e_2'(X) = A_2 \cos 2\pi \left( f_o \frac{x}{v_f} - \frac{v^2}{R_2\lambda} \frac{x^2}{v_f^2} \right)$$

$$e_4'(X) = A_4 \cos 2\pi \left( f_o \frac{x}{v_f} - \frac{v^2}{R_4\lambda} \frac{x^2}{v_f^2} \right)$$

$$e_1'(X) =$$

$$A_1 \cos 2\pi \left[ f_o \left( \frac{x}{v_f} - \frac{D}{2v} \right) - \frac{v^2}{R_2\lambda} \left( \frac{x}{v_f} - \frac{D}{2v} \right)^2 \right]$$

where A is related to the amplitude of the signal at the real antenna by a constant.

The instantaneous frequency (spatial) $f_{is}$ is recorded on the storage film 262 relative to a point X distance from a 0 reference point. The frequency $f_{is}$ which is defined as $$\frac{1}{2\pi} \frac{d}{dx}$$

of the argument of $\cos \phi(X)$ may be expressed for the point reflectors $T_2$, $T_4$ and $T_1$ as:

$$f_{iS2} = \frac{f_o}{v_f} - \frac{2v^2 X}{R_2\lambda v_f^2}$$

$$f_{iS4} = \frac{f_o}{v_f} - \frac{2v^2 X}{R_4\lambda v_f^2}$$

-continued $$f_{iS1} = \frac{f_o}{v_f} - \frac{2v^2}{R_2\lambda} \left( \frac{X}{v_f} - \frac{D}{2v} \right) \frac{1}{v_f}$$

Curves 284, 286 and 288 respectively represent the doppler history signals centered at $f_o/v_f$ for point reflectors $T_3$, $T_2$ and $T_1$ each having a distance duration of $V_f L_2/v$ and an instantaneous frequency spacing of $$\frac{vD}{R_2\lambda} \cdot \frac{1}{v_f}.$$

Curves 290, 292 and 294 respectively represent the doppler history signals for point reflectors $T_6$, $T_4$ and $T_5$ each having a film distance duration of $v_f L_4/v$ and an instantaneous frequency separation of $$\frac{vD}{R_4\lambda v_f}.$$

Thus the spatial length of the doppler history signals on the film is a function of the array length L which in turn is proportional to the range, that is, equal to $R\lambda/D$.

Figure 10:
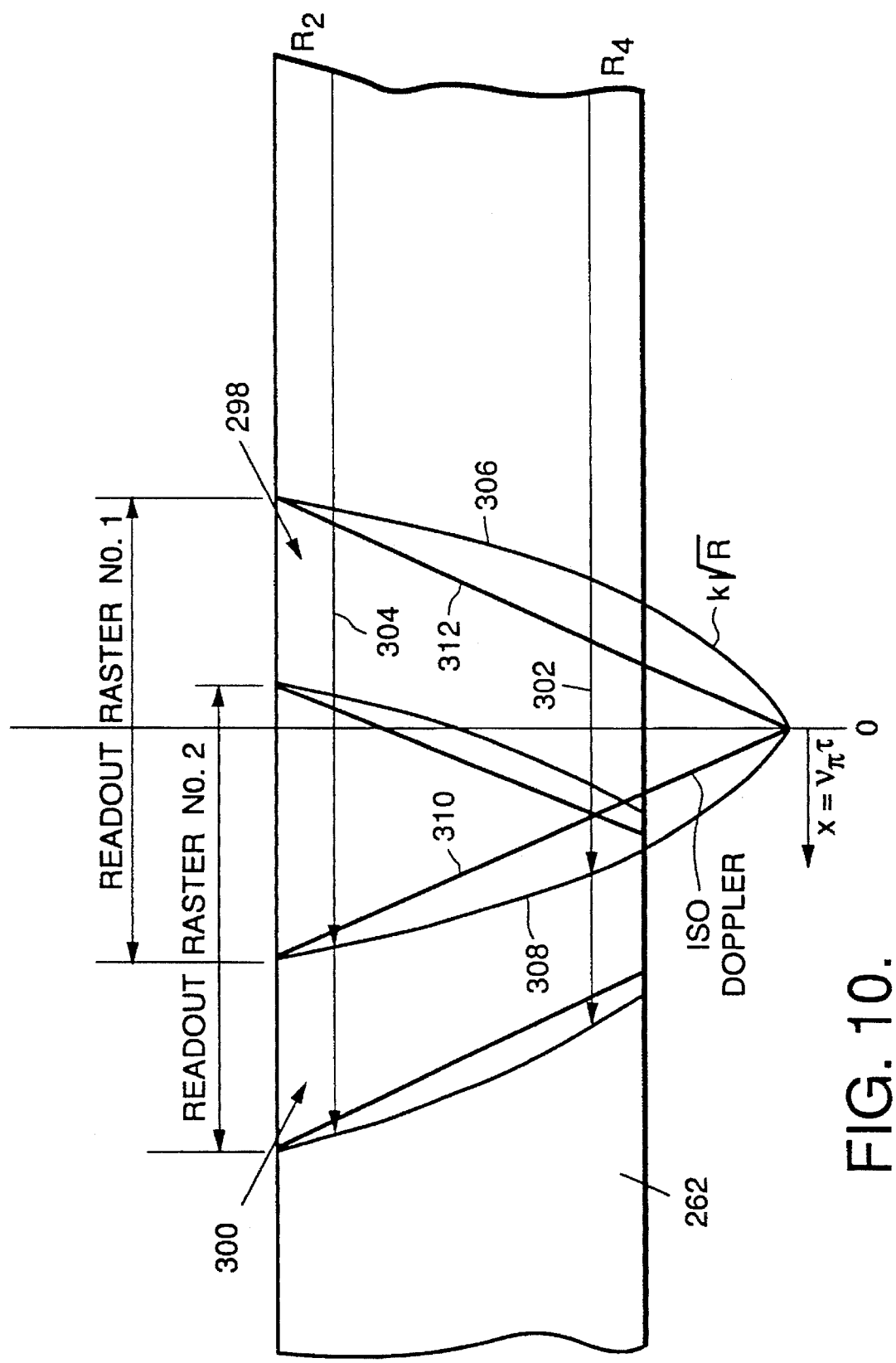
FIG. 10 is a schematic diagram of the film that may be utilized in the system of FIG. 3 is accordance with the invention for explaining the readout rasters.

Referring now to FIG. 10, the readout operation from the storage film 262 will be explained in further detail. The operation will be explained relative to a raster 298 centered at a zero position on the film With the distance along the film represented by $X=v_r t$ where $v_r$ is the velocity of the readout beam of the flying spot scanner. The rasters such as 298 and 300 are continually repetitive and overlap sufficiently along the film so that all doppler history signals are read once or portions thereof are read more than once. In one arrangement in accordance with the invention, the period of the readout raster is selected so that the film moves the width of the raster and the next raster is started at the end of the data read during the previous raster so that all data is read only once. The lengths of the readout lines are more than an array or stored doppler history length to read out a selected number of arrays such three arrays or doppler history signals in the illustrated arrangement. The length of the readout lines such and 304 are programmed by the square root of the vertical read out (range coordinate sweep) so that at range, for example, the width of the readout raster 0.707 of its value at maximum range. For an array at one-half range, the data is gathered in one-half the time as at maximum range and its slope is twice as great as at maximum range. By reducing the readout raster width as the square root of range from maximum to minimum range, the readout line velocity $v_r$ is reduced ratio of 1 at maximum range to 0.707 at half range, for example. However, because at one-half range, the array only occupies 0.707 of the reduced raster width or is of one-half the length occupied at maximum range, the readout frequency-versus-time slope for each doppler history signal is the same at all ranges. Thus, a greater number of arrays are read out at maximum range than at minimum range, but are gated or masked out in the system of the invention so that the final display has equal intensity characteristics at all ranges. The increasing of the readout length with increasing range (that is an increased velocity of readout spot) also displaces upward by a constant amount all doppler frequencies including the center frequency. Curves 306 and 308 show the extent of the readout raster 298 when controlled as a function of $k\sqrt{R}$ and lines 310 and 312 show the constant or iso-doppler points of the recorded data on the film. The additional elements and partial elements read out as a result of a line scan distance greater than required for the selected number of arrays are eliminated by time gating in the system in accordance with the invention.

The envelope functions developed on readout from point reflectors $T_2$, $T_4$ and $T_1$ may be expressed as follows:

$$e_2''(t) = A_2 \cos 2\pi \left( f_o \frac{v_r}{v_f} t - \frac{v^2 v_r^2}{R_2 \lambda v_f^2} t^2 \right)$$

$$e_4''(t) = A_4 \cos 2\pi \left( f_o \frac{v_r}{v_f} t - \frac{v^2 v_r^2}{R_4 \lambda v_f^2} t^2 \right)$$

$$e_1''(t) = A_1 \cos 2\pi \left[ f_o \left( \frac{v_r}{v_f} t - \frac{D}{2v} \right) - \frac{v^2}{R_2 \lambda} \left( \frac{v_r}{v_f} t - \frac{D}{2v} \right)^2 \right]$$

where $v_r$ is the readout spot speed and R is the slant range to the corresponding point target.

The instantaneous frequencies of the doppler history signals read from the film may be expressed as follows with $$f_{io} = \frac{1}{2\pi} \frac{d}{dt}$$

of the argument of $\cos \phi(t)$:

$$f_{io2} = f_o \frac{v_r}{v_f} - \frac{2v^2 v_r^2}{R_2 \lambda v_f^2} t$$

$$f_{io4} = f_o \frac{v_r}{v_f} - \frac{2v^2 v_r^2}{R_4 \lambda v_f^2} t$$

$$f_{io1} = f_o \frac{v_r}{v_f} - \frac{2v^2}{R_2 \lambda} \left( \frac{v_r}{v_f} t - \frac{D}{2v} \right) \frac{v_r}{v_f}$$

Substituting $v_r = k\sqrt{R}$:

$$f_{io2} = f_o \frac{k\sqrt{R_2}}{v_f} - \frac{2v^2 k^2}{\lambda v_f^2} t$$

$$f_{io4} = f_o \frac{k\sqrt{R_4}}{v_f} - \frac{2v^2 k^2}{\lambda v_f^2} t$$

$$f_{io1} = f_o \frac{k\sqrt{R_2}}{v_f} - \frac{2v^2 k^2}{\lambda v_f^2} t + \frac{V_D k}{\sqrt{R_2} \lambda v_f}$$

Figure 11:
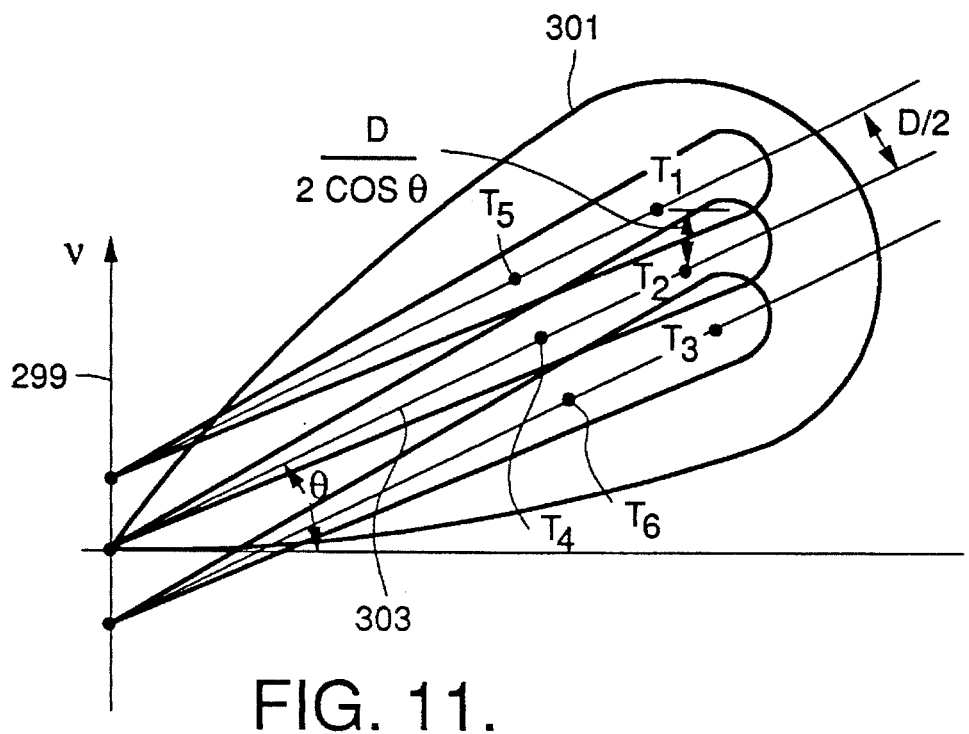
FIG. 11 is a schematic plan view showing the configuration of the real antenna and synthetic beams for a system operating with the antenna pointed at a squint angle relative to the broadside direction in accordance with the invention.

Referring now to the plan view of FIG. 11, the system of the invention will be explained when the real antenna 14 is pointed at a squint angle $\Theta$ relative to the broadside direction of an aircraft flight path 299. The angle $\Theta$ may be constant or variable within the scope of the invention. The instantaneous center 303 of a real antenna beam 301 is shown with point reflectors $T_4$ and $T_2$ at respective ranges $R_4$ and $R_2$ and with points $T_1$, $T_5$, $T_3$ and $T_6$ at a distance D/2 from the center line 303 of the beam in a direction orthogonal thereto. The distance parallel to the flight path 299 between point adjacent point reflectors which is the selected azimuth resolution distance is $$\frac{D}{2 \cos \Theta}.$$

The envelope e(t) of the bipolar video pulse train for the point reflectors $T_2$, $T_4$ and $T_1$ as developed by the radar system may be expressed as:

$$e_2(t) = A_2 \cos 2\pi \left( f_o t + \frac{2vt}{\lambda} \sin \Theta - \frac{v^2 t^2}{R_2 \lambda} \cos^2 \Theta \right)$$

$$e_4(t) = A_4 \cos 2\pi \left( f_o t + \frac{2vt}{\lambda} \sin \Theta - \frac{v^2 t^2}{R_4 \lambda} \cos^2 \Theta \right)$$

$$e_1(t) = A_1 \cos 2\pi \left[ f_o \left( t - \frac{D}{2v \cos \Theta} \right) + \frac{2v}{\lambda} \left( t - \frac{D}{2v \cos \Theta} \right) \sin \Theta - \frac{v^2 \left( t - \frac{D}{2v \cos \Theta} \right)^2 \cos^2 \Theta}{R_2 \lambda} \right]$$

It is to be noted that the term $v^2 t^2 / R_2 \lambda$ which defines the linear frequency change of each doppler history is multiplied by $\cos^2 \Theta$, thus decreasing the slope with increasing squint angle. The time spacing between doppler histories of adjacent point reflectors at all ranges is $$\frac{D}{2v \cos \Theta}.$$

The instantaneous frequencies of the signal developed by the radar system may be expressed with $$f_i = \frac{1}{2\pi} \frac{d}{dt}$$

of the argument of $\cos \phi(t)$ in the above expressions.

$$f_{i2} = f_o + \frac{2v}{\lambda} \sin \Theta - \frac{2v^2 t}{R_2 \lambda} \cos^2 \Theta$$

$$f_{i4} = f_o + \frac{2v}{\lambda} \sin \Theta - \frac{2v^2 t}{R_4 \lambda} \cos^2 \Theta$$

$$f_{i1} = f_o + \frac{2v}{\lambda} \sin \Theta - \frac{2v^2 \cos^2 \Theta}{R_2 \lambda} \left( t - \frac{D}{2v \cos \Theta} \right)$$

The term $$\frac{2v}{\lambda} \sin \Theta$$

represents the additional average offset frequency provided by the squint operation. The linear frequency variations vary as a function of $\cos^2 \Theta$ for the point reflectors along the antenna line of sight. The instantaneous frequency difference between adjacent resolution elements is a function of $$\frac{D}{2v \cos \Theta}$$

for the reflectors that are not along the line of sight at the particular instant being considered.

Referring back to FIG. 8, the bandwidth of the doppler histories for the squint operation is $$\frac{2v \cos \Theta}{D}$$

and the time duration of the arrays at respective ranges $R_4$ and $R_2$ is $$\frac{L_4}{v \cos \Theta} \text{ and } \frac{L_2}{v \cos \Theta}.$$

The spacing in time between array centers is $$\frac{D}{2v \cos \Theta}$$

and the frequency spacing at respective ranges $R_4$ and $R_2$ is $$\frac{vD}{R_4 \lambda} \cos\theta \text{ and } \frac{vD}{R_2 \lambda} \cos\theta.$$

The center frequency is $$f_o + \frac{2v}{\lambda} \sin\theta.$$

In the system in accordance with the invention, a squint control system is utilized to eliminate the effect of $$\frac{2v}{\lambda} \sin\theta,$$

the offset frequency is corrected in the radar system and the film velocity $v_f$ is varied to allow subsequent processing similar to the broadside operation of FIGS. 3 and 4. As shown in FIG. 2, the aircraft velocity $v$ and squint angle $\Theta$ are applied to the radar motion adjust circuit 69 so that the film velocity $vf = vf \cos\Theta$. The squint control system 41 responds to the aircraft velocity $v$ and to the squint angle $\Theta$ as well as the wavelength $\lambda$ which may be a constant to remove the extra doppler frequency $$\frac{2v}{\lambda} \sin\theta$$

provided by the squint operation. Thus the offset oscillator 42 develops a signal at a frequency $$-f_o \cos\theta + \frac{2v}{\lambda} \sin\theta.$$

The single sideband modulator 26 develops a signal at a frequency $$f_i + \frac{2v}{\lambda} \sin\theta - f_r \cos\theta$$

which is applied to the mixer 40 as the corrected offset frequency The signal developed by the mixer 30 has a frequency $$f_i + \frac{2v}{\lambda} \sin\theta - \frac{2v^2 t}{R\lambda} \cos^2\theta.$$

The mixer 40 responds to the signal received with the antenna pointing at an angle $\Theta$ and to the signal at the compensated offset frequency to develop a difference product $$f_o \cos\theta + \frac{2v^2 t}{R\lambda} \cos^2\theta$$

which frequency represents a signal that is the same as the signals recorded on the film as explained relative to FIG. 9 for the broadside system. It is to be noted that either the square root scanning system of FIG. 3 or the linear scanning system of FIG. 4 may operate with a selected or variable squint angle within the scope of the invention.

Figure 12:
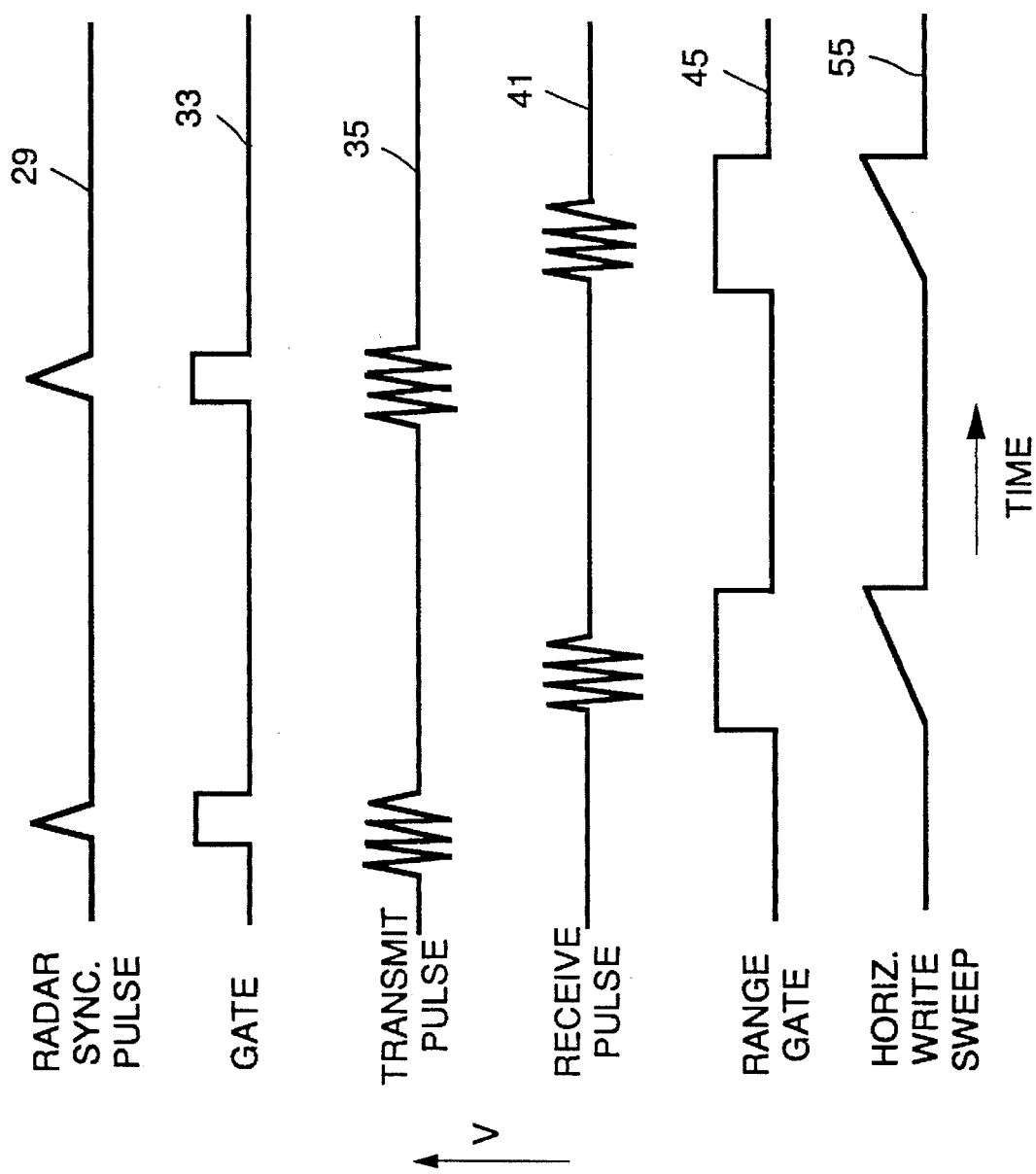
FIG. 12 is a schematic diagram of waveforms showing voltage as a function of time for explaining the operation of the system in accordance with the invention.
Figure 13:
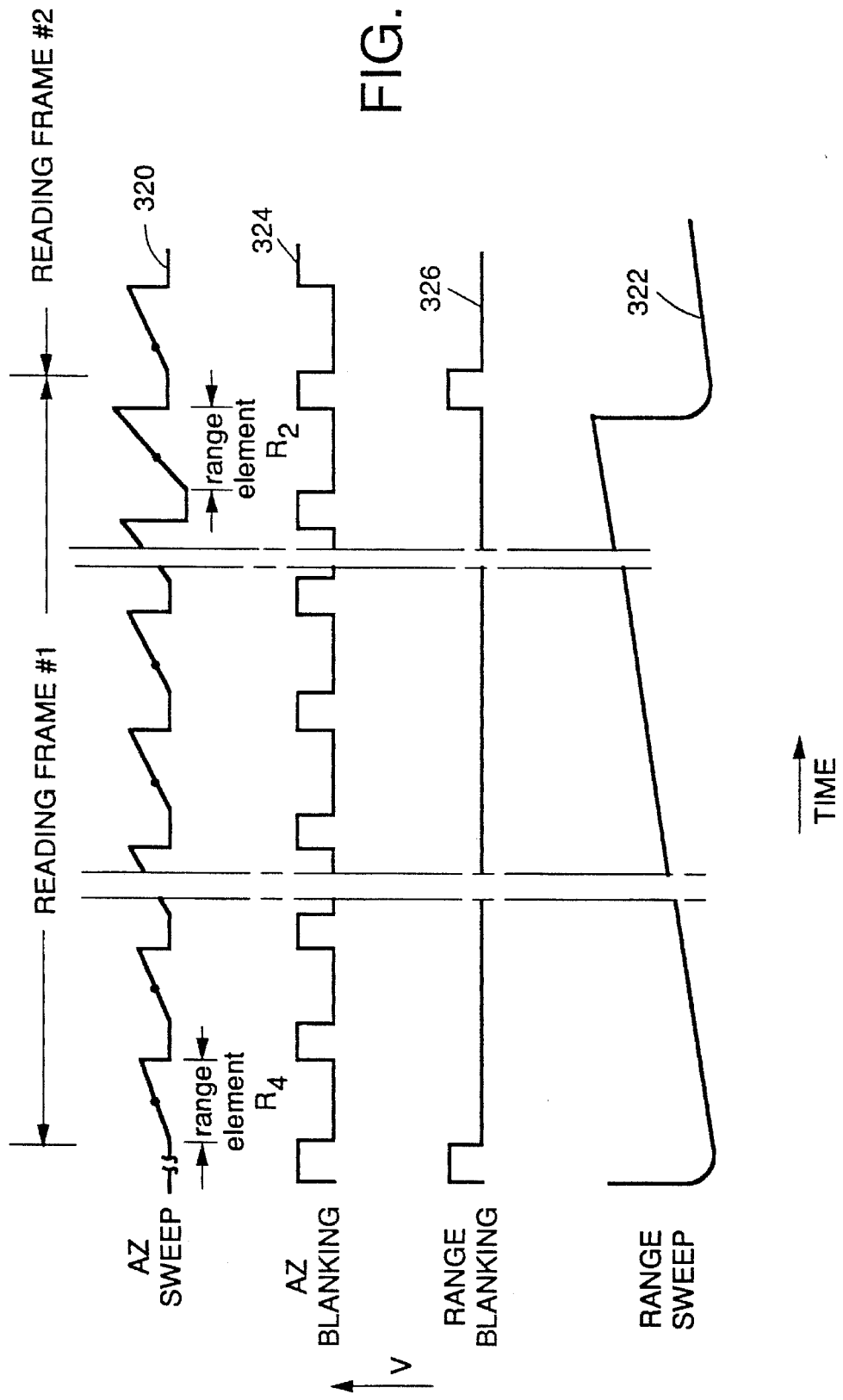
FIG. 13 is a schematic diagram of voltage as a function of time for explaining the readout operation in accordance with the principles of the invention.

Referring now to FIGS. 12 and 13 as well as to FIGS. 2 and 3, the transmission and readout operation time relations will be explained before further explaining the processor characteristics. The timing or radar synchronizing pulse 29 results in the squared waveform 33 being developed in the modulator 32 which gates the pulsed carrier waveform 35 to the antenna 14 for transmission into space at the frequency $f_t$. After interception of return energy by the antenna 14, the signal at the output of the IF amplifier 38 having a frequency $f_t-f_d$ is shown by the waveform 41. The range gated time interval for defining the swath to be mapped is defined by the range gate pulse of the waveform 45 and the horizontal sweep over all ranges applied to the recording cathode ray tube 50 as shown by the waveform 55. It is to be noted that the azimuth dimension is controlled by moving the film 66 as a function of the radar or platform velocity in the arrangement of FIGS. 2, 3 and 4.

In FIG. 13 the time relation between the output sweeps of the variable gain amplifier 87 (FIG. 3) and the range sweep generator 84 during each reading frame is respectively shown by the waveforms 320 and 322. The waveforms 324 and 326 respectively show the azimuth and range blanking pulses that may be applied to the intensity grid of the read cathode ray tube to extinguish its electron beam during flyback times. It is to be noted that an increasing slope is provided in the system of FIG. 3 around a center time position of each line scan time in the azimuth sweeps of the waveform 320 for controlling the reading sweep along each range interval so that the spot moves at increasing velocity with increasing range as a function of the square root of range. In the system of FIG. 4, the azimuth readout sweep is maintained at a constant slope.

Figure 14:
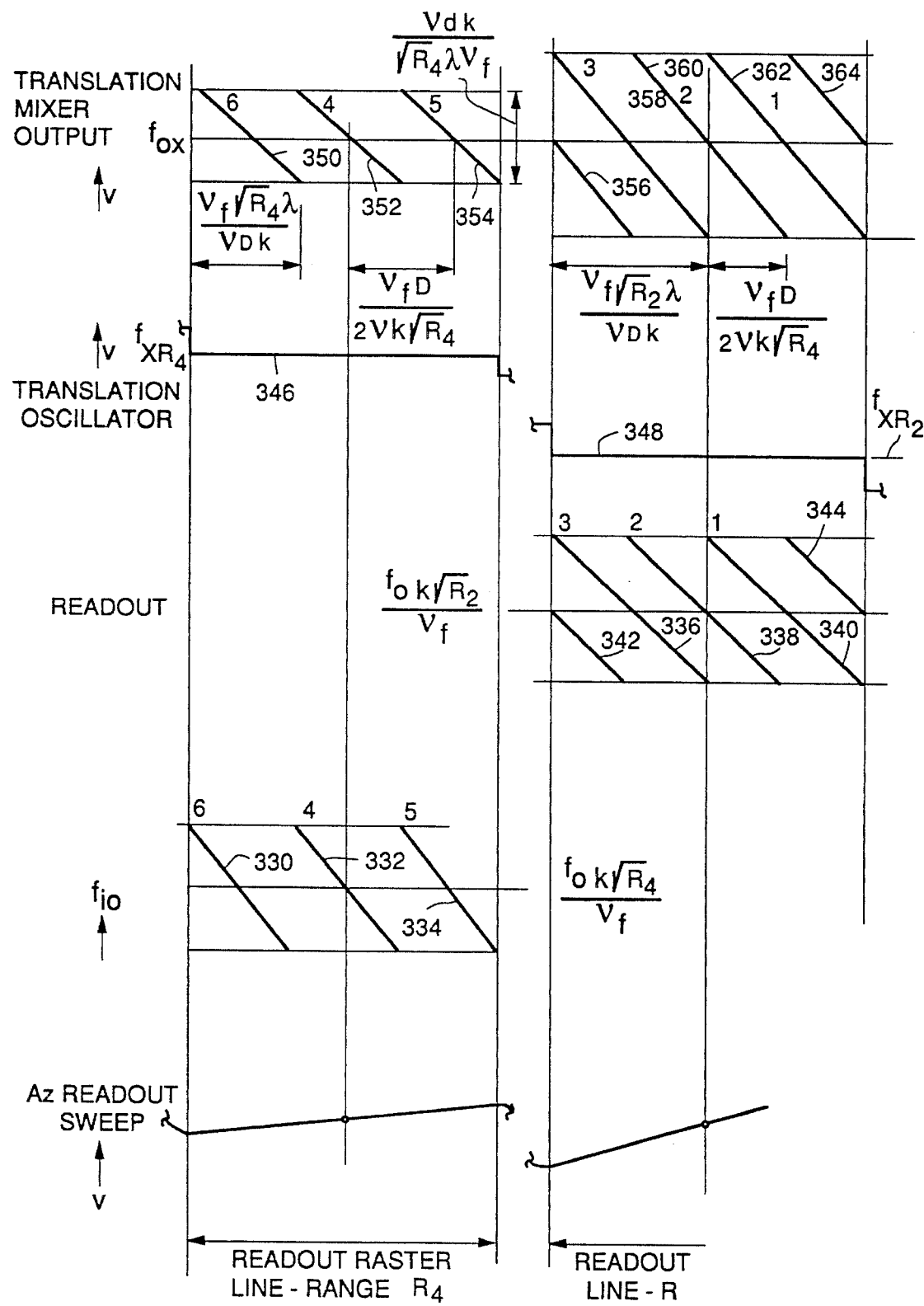
FIG. 14 is a graph of frequency and voltage as a function of time for explaining the operation of the system in accordance with the invention.

Referring now to FIG. 14 as well as to FIGS. 2 and 3, the instantaneous frequencies read out from the film 66 are shown by lines 330, 332 and 334 for respective point reflectors $T_6$, $T_4$ and $T_5$ at range $R_4$ and by lines 336, 338 and 340 for point reflectors $T_3$, $T_2$ and $T_1$ at range $R_2$. Lines 342 and 344 at range $R_2$ are partial arrays that may be time gated out by the time gate 110 or removed by the mask 119 or 121 at the display. It is to be understood that an increased number of complete arrays (not shown) may be read out at increased range over any swath with each array being processed by the dispersive delay line or filter 106. Because of the $\sqrt{R}$ readout function, the time spacing between adjacent resolution elements is substantially less at maximum range than at minimum range. In order to maintain constant brightness on the display, any additional arrays are eliminated by either the time gate 110 or the masks such as 119 and 121. At range $R_4$, the length of each array in time is $$\frac{v_f L_4}{v k \sqrt{R_4}},$$

and the common center frequency is $$\frac{f_o k \sqrt{R_4}}{v_f}.$$

At a greater range $R_2$, the length of each array such as 336 in time is $$\frac{v_f L_2}{v k \sqrt{R_2}}$$

and the center frequency is $$\frac{f_o k \sqrt{R_2}}{v_f}.$$

Because $$L_4 = \frac{R_4 \lambda}{D} \text{ and } L_2 = \frac{R_2 \lambda}{D},$$

the array lengths in time at respective ranges $R_4$ and $R_2$ may be expressed as $$\frac{v_f \sqrt{R_4 \lambda}}{v D k} \text{ and } \frac{v_f \sqrt{R_2 \lambda}}{v D k}.$$

The time spacing between adjacent arrays such as 330 and 332 at range $R_4$ is $$\frac{v_f D}{2 v k \sqrt{R_4}}$$

and between adjacent arrays such as 336 and 338 at range $R_2$ is $$\frac{v_f D}{2 v k \sqrt{R_2}}.$$

The total frequency excursion at each range may be expressed as $$\frac{2 v k \sqrt{R}}{D v_f}$$

increasing as the square root of range. The slopes $f_{io}$ of the arrays such as 330 and 336 may be expressed at all ranges as $$\dot{f}_{io} = \frac{2 v^2 k^2}{\lambda v_f^2}$$

because the range parameter has been eliminated by varying the sweep length as a function of $\sqrt{R}$. Thus reliable processing may be performed at all ranges while maintaining the sweep oscillator 98 at a constant frequency-versus-time slope over each of the plurality of azimuth readout periods.

Because of the variation of the slope of the readout azimuth sweep of the waveform 320 and the resultant $\sqrt{R}$ increase in sweep spot velocity with range, the center frequency of the arrays increases proportional to the square root of range. The offset or translation oscillator 88 has a frequency $f_x$ which is a function of the $\sqrt{R}$ decreasing with increasing range of each azimuth read out line over each raster, as shown by waveforms 346 and 348. By utilizing the sum (or the difference) output signal from the mixer 93, the arrays totally read out at all ranges are translated to a common center frequency $f_{ox}$ as shown by lines 350, 352 and 354 for range $R_4$ and lines 358, 360 and 362 for range $R_2$, which arrays are applied to the focus mixer 97. Although in the illustrated arrangement the sum product is utilized at the output of the offset mixer 93, the difference product may also be utilized in accordance with the invention. As will be explained subsequently, the difference product from the mixer 97 reduces the bandwidth of the doppler history signals.

Figure 15:
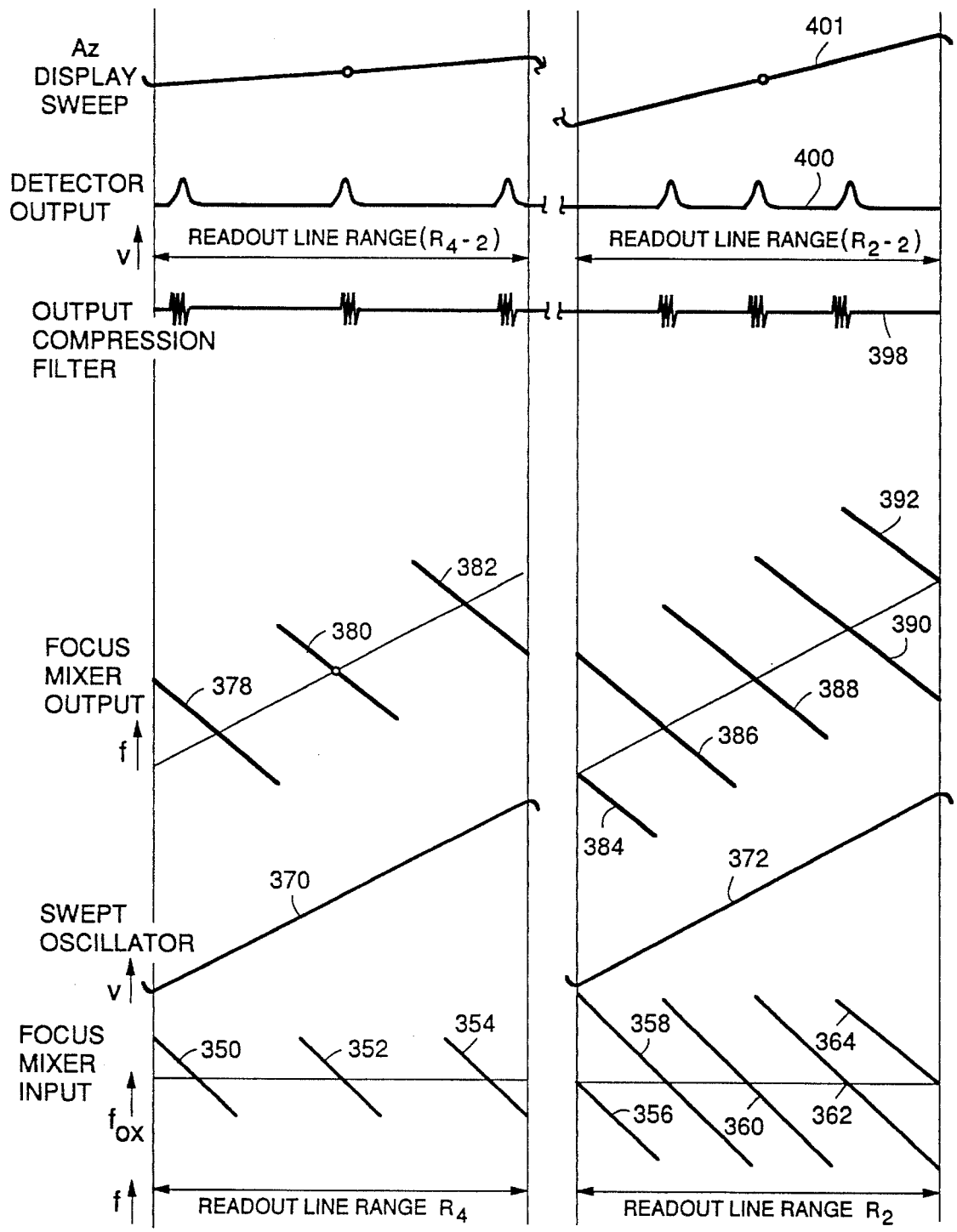
FIG. 15 is a graph of frequency and voltage as a function of time for further explaining the operation of the system in accordance with the invention.

Referring now to FIG. 15, the sweep oscillator 98 provides ramp signals of a constant slope during each readout line time as shown by sweeps 370 and 372 at respective ranges $R_4$ and $R_2$. The sweep oscillator excurses linearly in frequency over each entire readout line period with a slope set so that there remains a frequency-versus-time slope in the mixer's output frequency, which slope matches the slope of the compression filter 106. Although in the illustrated system the sum signal is applied to the output of the mixer 97, the principles of the invention are equally applicable to utilizing the difference product signal from the heterodyning operation. The same magnitudes of doppler frequency excursions at the output of the mixer 97 are processed for each point reflector at a particular range independent of target or point reflector position along the flight path. Because of the sweep oscillator 98, a different doppler time displacement results in a different frequency displacement at the output of the mixer 97 which frequency displacement is converted into only time displacement of the major maximum of the envelope at the output of the compression filter 106. At range $R_4$, the sum signals at the output lead of the mixer 97 are signals 378, 380 and 382. The sum signals developed by the mixer 97 at range $R_2$ are signals 384, 386, 388, 390 and 392. At each increasing azimuth the array signals have an increasing center frequency. Signals of a waveform 398 represent the compressed pulses developed by the dispersive delay line 106 from data read during two previous line sweeps and including a predetermined delay of a portion of a sweep time as will be explained relative to FIG. 16. The readout pulses of the waveform 398 are established in the system of FIG. 3 in the proper time position with the display azimuth sweep of a waveform 401, the azimuth sweep increasing in slope with increasing range. The envelope signals of a waveform 400 are developed by the detector 108 for controlling the intensity grids of the display tubes.

Figure 16:
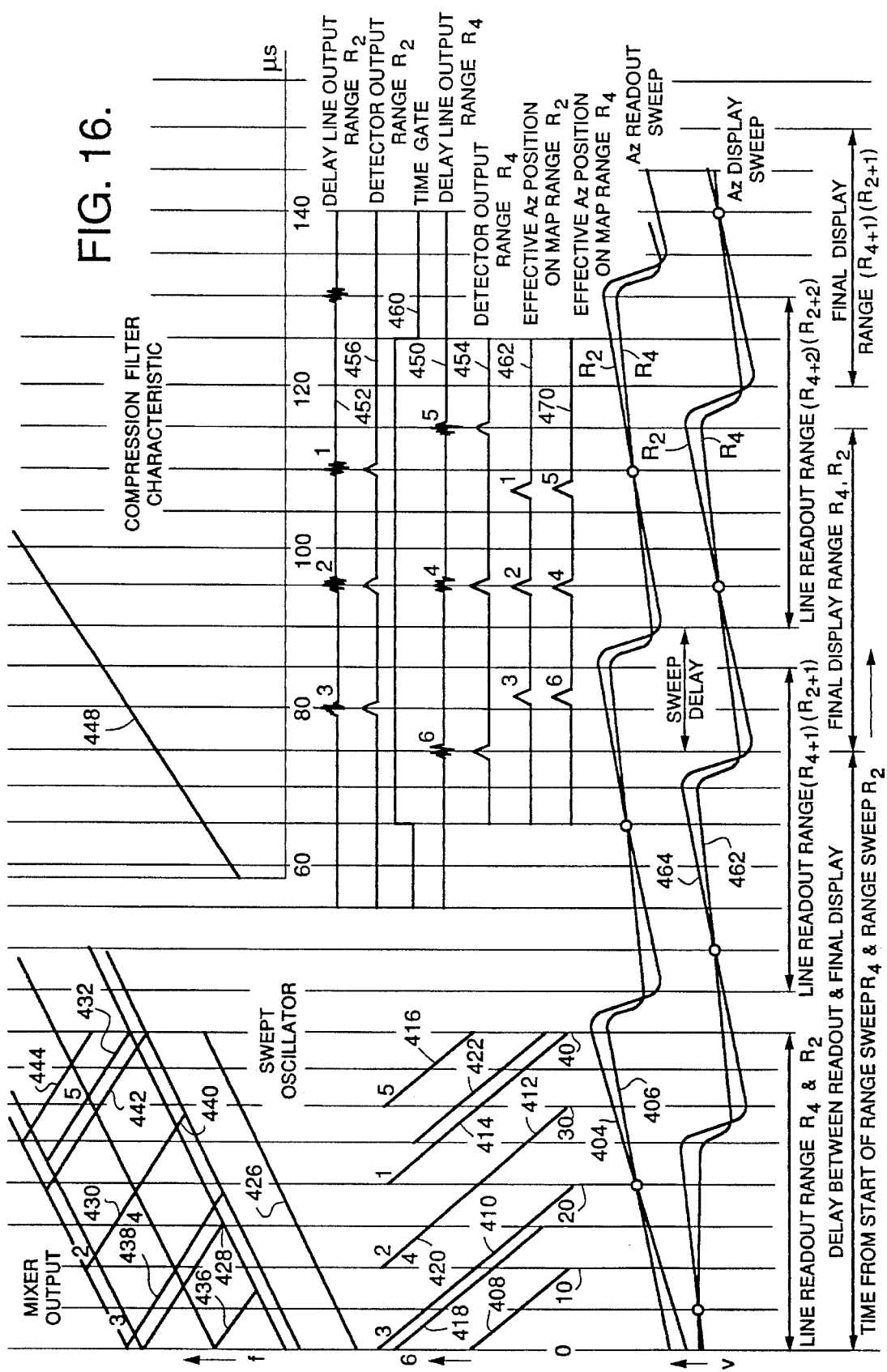
FIG. 16 is a graph for further explaining the operation of the dispersive delay line or compression filter in accordance with the principles of the invention.

Referring now also to FIG. 16, the operation of the dispersive delay line or compression filter 106 will be explained in further detail. For convenience of explanation, time is plotted to be either from the start of the azimuth sweep at range $R_4$ or from the start of the azimuth sweep at range $R_2$. Although the time of each readout line is illustrated as 40 microseconds with 5 microseconds flyback time, the invention is not to be limited to any particular readout intervals or processing intervals. The readout sweep of waveforms 406 and 404 which provide the square root of range function readout raster are respectively for ranges $R_4$ and $R_2$ and both increase in slope at ranges greater than $R_4$ or $R_2$. Lines 418, 420 and 422 represent the arrays at the output terminal of the mixer 97 for range $R_4$ and lines 408, 410, 412, 414 and 416 represent the arrays at the output terminal of the mixer 97 for range $R_2$. A line 426 represents the frequency-versus-time excursion of the swept oscillator 98 during each azimuth line sweep to develop sum signals of lines 428, 430 and 432 at range $R_4$ and of lines 436, 438, 440, 442 and 444 for range $R_2$. A line 448 represents the linear frequency-versus-delay-time characteristic of the illustrated dispersive delay line 106 having a slope matched inversely to or the conjugate of the slope of the mixer output signals as determined by the selected slope of the swept oscillator 98. It is desirable to space over the entire active readout line interval the compression line output pulses, each of which represents an azimuthal resolution element. For the data comprising a given array to be time compressed in the illustrated delay line, the time delay encountered in the line must decrease (as a result of the frequency excursion over the array) by an amount exactly equal to the time required to read the array, that is, the compression line frequency slope characteristic must be numerically equal to, but of opposite sign to, that of the readout raw data. The change in the time delay of the compression line resulting from the swept oscillator frequency excursion between array and elements plus the incremental time spacing on readout between array end elements must not exceed the active readout line interval.

The arrays 428, 430 and 432 are compressed by the delay characteristic of the line 448 to form corresponding pulses of a waveform 450 and the arrays 436, 438, 440, 442 and 444 are compressed to form corresponding pulses of a waveform 452. The pulses of the waveforms 450 and 452 occur at a time which is the sum of the start of reading an array relative to a reference time plus the delay provided by the dispersive lime. It is to be understood that the pulses of the waveforms 450 and 452 occur at different range sweep intervals. In the following table, for each array the $t_e$ time of excursion, the delay time $t_d$ of each array at the illustrated frequencies and the time $t_t$ of development of the major maximum of the output pulse is shown relative to the illustrated zero time starting point of each line sweep.

| Point Reflector of Array | $t_e$ | $t_d$ | $t_t$ | |
|---|---|---|---|---|
| $T_6$ | 0 | 60 | 75 | |
|  | to | to |  | |
|  | 15 | 75 | 75 | |
| $T_4$ | 12 | 70 | 95 | |
|  | to | to |  | RANGE $R_2$ |
|  | 27 | 83 | 95 | |
| $T_5$ | 24 | 80 | 115 | |
|  | to | to |  | |
|  | 39 | 91 | 115 | |
| $T_3$ | 0 | 60 | 78 | |
|  | to | to |  | |
|  | 20 | 78 | 78 | |
| $T_2$ | 10 | 67 | 95 | |
|  | to | to |  | RANGE $R_4$ |
|  | 30 | 85 | 95 | |
| $T_1$ | 20 | 74 | 112 | |
|  | to | to |  | |
|  | 40 | 92 | 112 | |

Thus, at each range, all of the arrays are evenly spaced by the compression line and the slope of the delay line is selected so that at minimum range all pulses occur within one readout interval. At the minimum range $R_2$ as shown by the waveform 450, the compressed pulses are spaced with a greater time interval therebetween resulting from the $\sqrt{R}$ readout raster. The corresponding envelope detected pulses developed from the waveforms 450 and 452 are shown by respective waveforms 454 and 456. The partial arrays of lines 436 and 444 are integrated into low amplitude pulses which are removed at the time gate 110 by the gating pulse of a waveform 460 at maximum range or removed by the masks 119 and 121. It is to be noted that the pulse of the waveform 60 decreases in width as a function of range.

A center array such as 412 read out between times 10 and 30 microseconds is compressed at the output of the delay line at a time of 95 microseconds. Thus, the data at the center of the read out line is available for display 67 microseconds after completion of readout of that array. To bring the display azimuth sweep in time correspondence with the data, the final display sweeps of waveforms 462 and 464 are delayed 15 microseconds from the readout sweeps 404 and 406 in the delay line 118. Also, the azimuth sweep of the waveforms 462 and 464 is varied in slope as a function of the square root of range similar to the readout sweep so that the data is properly recorded on the final display or map. In order to bring the range sweep in synchronism with the raster period, the delay line 107 provides a delay equal to the inherent delay time of the compression filter 106. Display rasters 113 and 117 (FIG. 3) shown on the tube 112 and the map film 120 are similar to the readout raster 71. Pulses of the waveforms 468 and 470 show the effective azimuth position of resolution elements at respective ranges $R_2$ and $R_4$ as recorded on the display as a result of utilizing the variable slope azimuth sweeps of waveforms 462 and 464. It is to be noted that the sweep delay is selected so that detected pulses are centered during the occurrence of the azimuth display sweep. The flyback time for the sweep in the range dimension may be sufficiently long so that display of each raster is complete before starting the next raster or because of the continuous delay in the compression filter, the final recording from the last readout line may be performed at or after the real time start of the next raster. It is to be noted that the compression filter operates similarly for both the systems of FIGS. 3 and 4 as explained relative to FIG. 16.

Figure 17:
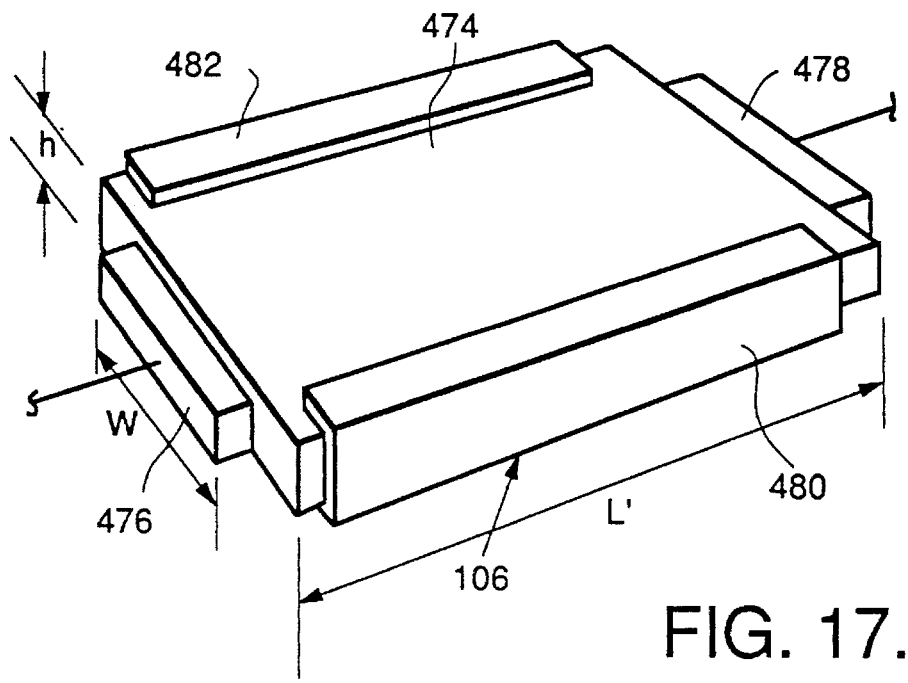
FIG. 17 is a perspective drawing of a typical dispersive delay line that may be utilized in accordance with the principles of the invention.

Referring now to FIG. 17, one typical dispersive delay line that may be utilized in the systems of FIGS. 3 and 4 will be further described, being an ultrasonic dispersive delay line. Also in accordance with the invention, the line 106 may include separate ultrasonic delay lines coupled in series, for example. The line 106 may be formed of a structure 474 which may be any suitable low loss material such as aluminum or spring steel with the latter being superior at frequencies above 10 MC (megacycles). For converting the electrical energy to mechanical energy at the input and the mechanical energy to electrical energy at the output, an input transducer 476 and an output transducer 478 are positioned at the corresponding ends of the delay medium 474. Channels 480 and 482 of an absorbent material may be positioned around the edges of the delay medium 474. The electrical input signal excites the input transducer 476, which vibrates mechanically to launch an elastic wave into the medium. The wave travels at the velocity of sound through the medium 474 and mechanically excites the output transducer 478 to be converted back to an electrical signal. Because the velocity of sound in solids is low (approximately $10^{-5}$ times the velocity of light in free space), the wavelength of the ultrasonic signal in the delay medium 474 is correspondingly smaller than that of an electromagnetic wave at the same frequency in free space, and the delay over a length L' is proportionally larger. Thus a strip of delay medium several inches long represents many miles of electromagnetic waveguide.

The required dimensions of the delay line may be expressed as follows:

$$h = \left(\frac{f_h}{C_s}\right)_o \left(\frac{C_s}{f_o}\right)$$

where f=frequency, $C_s$=shear velocity of the delay material, and $f_o$=the desired center frequency.

$$L' = \frac{\left(\frac{dt}{df}\right)}{\frac{d(TC_s/L')}{d\left(\frac{f_h}{C_s}\right)}} \times \frac{C_s 2}{h}$$

where dt/df=the desired delay characteristic slope,

T=group delay, the time required for energy to travel through the medium, and h=thickness of the thin strip 474.

The delay $T_o$ at frequency $f_o$ is:

$$T_o = \left(\frac{TC_s}{L'}\right)_o \left(\frac{L'}{C_s}\right)$$

For a typical spring steel dispersive delay line, the following expressions define the above parameters:

$$h = \frac{0.0938}{f_o}$$

-continued $$L' = \frac{\frac{dT}{df}}{7.51}$$

$$T_o = 11.5L'$$

The transducers 476 and 478 may be any suitable material, with material having piezoelectric or magnetostrictive properties producing the highest conversion efficiency. For example, the transducers may be thin films of piezoelectric semiconductor or magnetostrictive ferrites, having a fundamentally resonant thickness of a value equal to h, and may be formed directly on the surface of the delay medium 474 such as by vacuum deposition or electrolysis. For piezoelectric semiconductors, the zinc blend group such as gallium arsenide with cubic crystallene structures and the wurtzite group with hexagonal crystallene structure such as cadmium sulfide may be utilized, for example. The delay medium 474 may desirably be an electrical conductor to permit electrical grounding and suppression of the direct coupling of the input signal.

Figure 18:
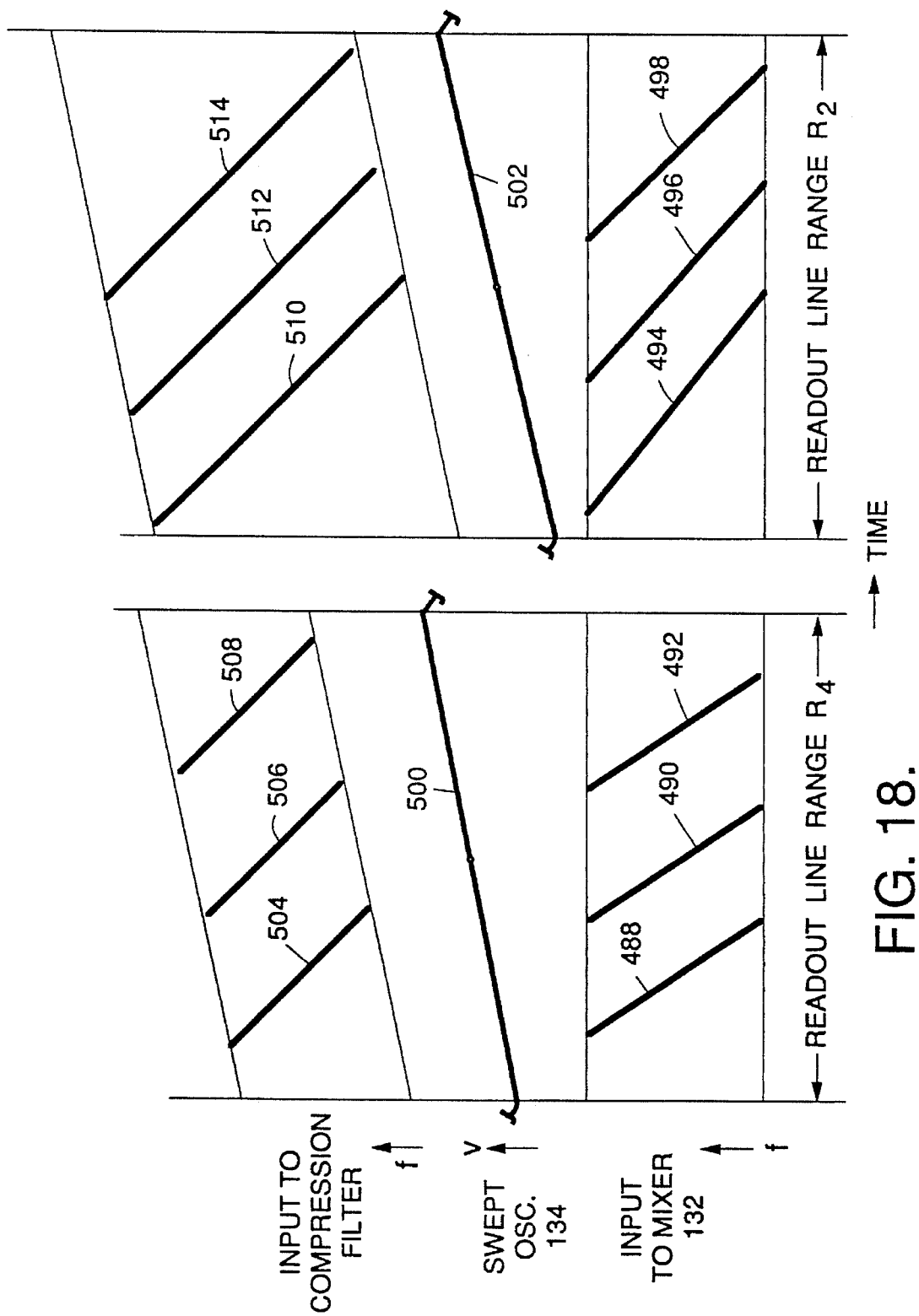
FIG. 18 is a diagram showing waveforms of frequency and voltage as a function of time for explaining the radar operation in accordance with the invention.

Referring now to FIG. 18 as well as to FIG. 4, the operation of the linear sweep system will be described in which the read out sweep lengths are constant and the slope of the swept oscillator 134 is varied as a function of range. The readout arrays are shown for range $R_4$ by lines 488, 490 and 492 and for range $R_2$ by lines 494, 496 and 498. The time spacing of the readout doppler history signals is the same at all ranges and the bandwidth of readout history signals is the same for all ranges. The frequency-versus-time slope of the arrays are different for each range, decreasing in slope with increasing range. Thus, in order to develop arrays with constant slopes for application to the compression filter, the sweep oscillator 134 is varied in slope inversely with the first power of range as shown by sweeps 500 and 502 for respective ranges $R_4$ and $R_2$. The range sweep is applied from the range sweep generator 84 to the variable gain amplifier 136 for decreasing the slope of the sweep as a function of R at each range interval with increasing range, during each readout raster. At the output lead of the mixer 132, the arrays of lines 504, 506 and 508 at range $R_4$ and the arrays of lines 510, 512 and 514 at range $R_2$ all have the same frequency-versus-time slope, as well as the arrays for all other read out line or azimuth times during the repetitive rasters. The sum products from the mixer 132 are illustrated in FIG. 18. The center frequencies of arrays increase with frequency from the starting time of each read out line similar to the arrangement of FIG. 3 except with a slope that is also a function of the decreasing slope of the swept oscillator signal of the waveforms 500 and 502. The bandwidth of the arrays at greater range such as the doppler history signals 510, 512 and 514 increases because of the increased time duration of the history signals from each point reflector. The processing operation at the dispersive delay line 106, the envelope detector and the time gate 110a, 108 is similar to that explained relative to the system of FIG. 3, with the time separation of the output pulses occurring with a greater time separation at near ranges than at far ranges as a result of the variable slope (with range) of the swept oscillator. In the system of FIG. 4, the sweep length is varied as a function of range at the display tubes 112 and 114 to provide a trapezoidal raster. The display device 112 or the mapping device (not shown) responds to the delayed azimuth sweep from the source 82 and the delayed range sweep from the source 84. Thus in the arrangement of FIG. 4, the azimuth sweep lines such as 150 and 152 vary in length as a function of range at the display devices.

Figure 19:
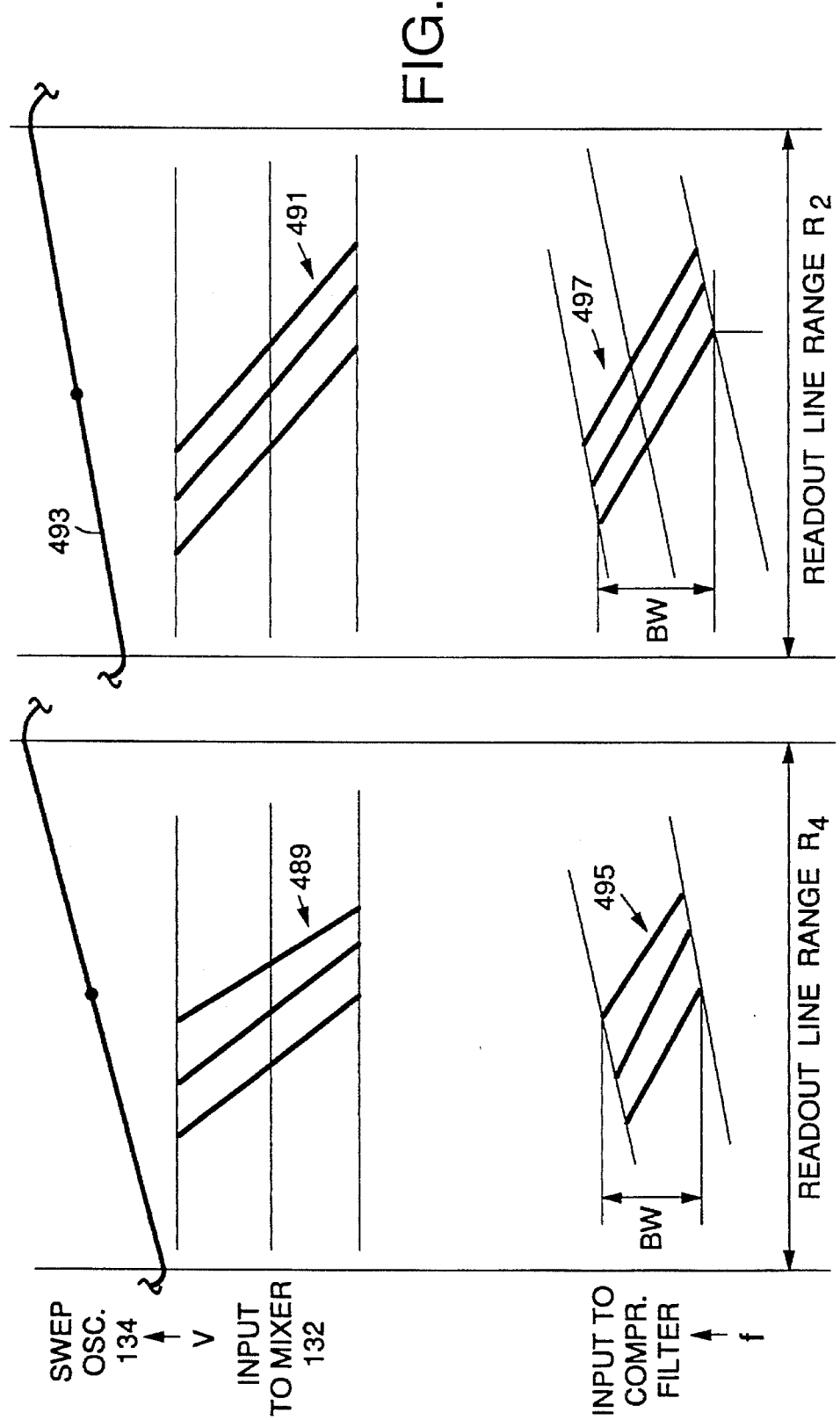
FIG. 19 is a diagram showing waveforms of frequency and voltage versus time for explaining the bandwidth reduction of the doppler history signals that may be provided prior to the compression filter in accordance with the invention.

Referring now to FIG. 19, the system of FIG. 4 will be explained when the difference product developed by the mixer 132 is applied to the compression filter 106. The input to the mixer 132 illustrated by groups of doppler history 489 and 491 at respective ranges $R_4$ and $R_2$ are applied to the mixer 132 to be heterodyned with the swept oscillator signal of a waveform 493. The doppler history signals are shown closely spaced and as a portion of readout data in a system reading out more than three arrays for illustrating the bandwidth reduction. The difference product is shown by groups of doppler history signals 495 and 497 having bandwidths substantially reduced from the bandwidth of the corresponding groups of signals 489 and 491. Thus the compression requirements which are a function of the bandwidth and time product are reduced in the compression filter 106 in accordance with the invention. Therefore, in a system having a selected heterodyning operation and utilizing the swept oscillator to remove part of the slope of the doppler signals, the compression ratio of the filter approaches at one range the number of azimuth elements to be processed per readout line, rather than the ratio of the array length to the resultant azimuth resolution element. For example, with a compression filter having a 10 to 1 compression ratio, the array length to resolution element ratio may be at 1500 feet to 20 feet, null-to-null (D), 1500/20 or 75 to 1.

In a similar manner, the system of FIG. 3 reduces the required compression ratio of the filter by utilizing the difference product from the mixer 97 so as to reduce the bandwidth similar to the illustration of FIG. 19. Thus depending upon the selection of readout velocity and heterodyning arrangements, the systems of the invention may either utilize the sum or the difference of the products for application to the compression filter. When the difference of the products is utilized, the required compression ratio of the filter is reduced in accordance with the invention.

Referring now to FIGS. 20, 21, 22 and 23 as well as to FIGS. 5 and 6, the operation of the processing systems of FIGS. 3 and 4 will be explained when utilizing a storage tube instead of a storage film in accordance with the principles of the invention. In order for the correlator to operate continuously, the scan converter storage tube 170 may store two redundant sets of raw data which is achieved through use of a delay arrangement such as the delay line 180 which in turn may be of any suitable type such as an ultrasonic delay line or a lumped parameter delay line. The line 180 delays the data slightly more than the range gated swath interval and the delayed data as well as the instantaneous data are applied to the same intensity grid of the tube 170. Thus, the data is available twice in time sequence so that it can be recorded on two successive but displaced sweeps of the scan converter tube writing beam.

Figure 20:
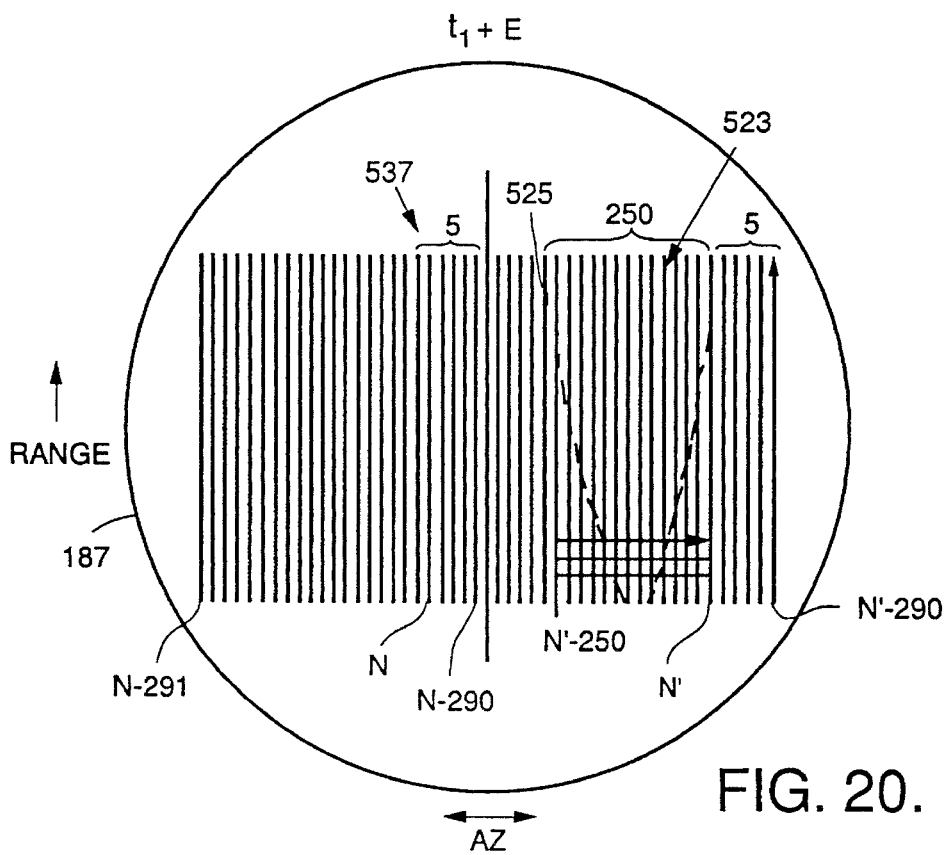
FIGS. 20 and 21 are schematic diagrams of the storage surface for explaining the recording and readout format that may be utilized with a scan converter storage tube in accordance with the invention.

The readout process is performed simultaneously and independently of the writing process. The illustration of FIG. 20 represents a condition after recording is started such as at a time $t_1+\epsilon$ where $\epsilon$ represents the completion of an erasure operation of lines N-290 and N'-290 on the storage screen 187. After completion of this erasure operation, the erase bands such as 537 each include five vertical erase positions. Prior to this erasure time, trace N has been recorded on the left hand edge of the storage surface adjacent to an erase band 537 and the recording beam is then step deflected to a region to the right of center during its vertical retrace and the sweep repeated recording trace N', a delayed replica of the same range sweep data. At the next time period after the state shown in FIG. 20 which may be $$t_1 + \frac{1}{PRF},$$

where PRF is the pulse repetition frequency, the two traces

N+1 and N+1 are recorded on the tube, the N'+1 being on the right hand half of the tube. At this time, the erase bands have a width of four vertical lines. The readout raster 523 for linear operation and a portion of 525 for square root operation are maintained over 250 lines for the illustrated arrangement. It is to be noted that the square root raster 525 only includes 250 lines at the maximum range position.

Figure 21:
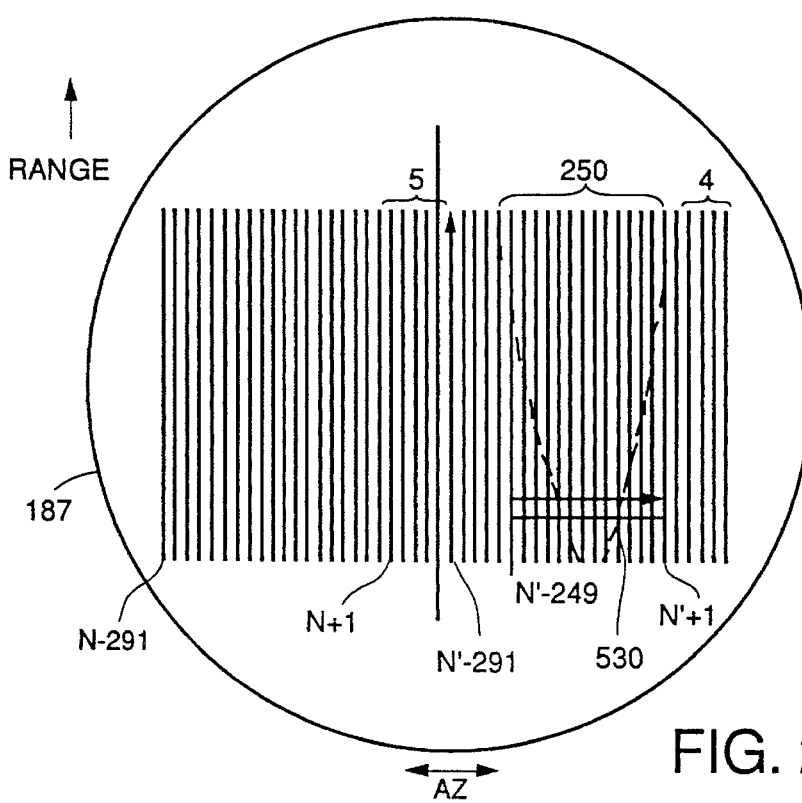

Thus, the sequence is such that immediately after recording a trace, the tube grid potentials are switched to erasure conditions, the writing beam is step deflected to the original recorded position of the oldest trace at the left hand side of the surface and the beam is swept vertically with constant intensity level which maintains the trailing erase band in positions other than the permanent edge bands. Similarly, the trace to the right of center and adjacent to the readout raster is then selectively erased to maintain the leading erase band of five or four erased vertical lines. At time $$t_1 + \frac{1}{PRF} + \epsilon$$

as shown in FIG. 21, the traces N-291 and N'-291 are erased to start formation of the erase band at the left hand side of the tube. At the end of this time, the erase band at the left and right hand sides of the readout raster are 5 and 4 traces in width. The operation continues in a similar manner until the readout raster such as 530 shifts to the left hand side of the tube adjacent to the erase band at the center of the tube and the trailing erase band becomes the leading erase band. It is to be noted that in the system of FIGS. 20 and 21, the tube is selected with 580 vertical trace positions for purposes of explanation. Thus the illustrated operation for recording, erasing and reading is continuous by storing two sets of redundant range information.

Figure 22:
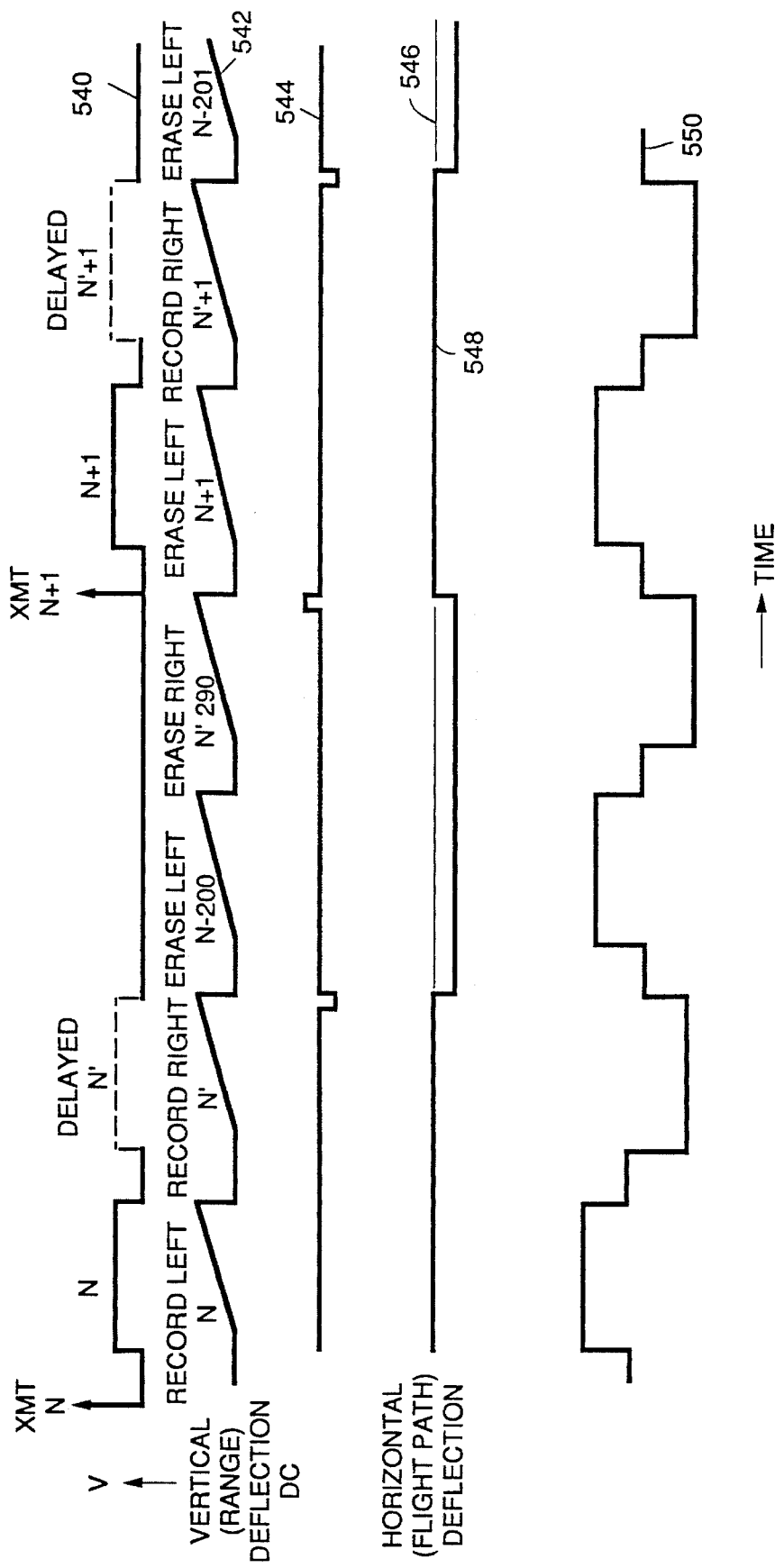
FIG. 22 is a schematic diagram of waveforms showing voltage as a function of time for explaining the operation of the scan converter storage tube of FIGS. 5 and 6.

A waveform 540 of FIG. 22 shows the time of transmission of the N radar pulse and the N+1 radar pulse. Each pulse N is received and recorded during an N range gate interval and delayed to be recorded on the right half of the tube during a delayed N or an N' interval. As shown by the vertical range deflection sweep of a waveform 542, the traces N-290 and N'-290 are erased during the radar inactive or "dead" time. The same sequence is repeated in response to radar transmit pulse N+1. The line Jump pulses of a waveform 544 are applied to the integrator 198 of opposite polarity for recording and erasing to change the charge on the capacitor 201 (FIG. 6). The DC voltage of a waveform 546 is developed with a decreasing level during the period of recording across the tube surface 187, that is, between the multiar dumping pulses. The combination of the integrated waveform 544 and the waveform 546 as shown by a waveform 548 is applied to the summing circuit 195 (FIG. 5) for providing the movement of the vertical sweeps across the tube and to provide the 5 line offset between recording and erasing. The pulse generator 189 develops pulses having a shape similar to those of a waveform 550 except with a constant DC level. The voltage change from the level of a positive pulse to the level of a negative pulse provides a deflection of one-half of the width of the tube surface 187. The summing circuit 195 generates the deflection voltage of the waveform 550 which provides the half tube width deflection, the recording and erasing positions and the constant movement of recording and erasing positions A synthetic array processing system which simultaneously across the tube from left to right. The multiar circuit 204 is controlled to discharge the capacitor 201 and return the recording and erasing deflection position to the left when the extreme right hand tube position has just been written. On the right hand position of the tube, when the last trace written is within one erase bandwidth of the edge, a summing pulse is supplied from the pulse generator 199a to the summer 195 for being combined with the waveform 550 during the erase intervals and for the time duration required for the last written trace to arrive at the extreme right hand position of the tube. In the illustrated example this summing pulse will occur during four erase intervals for the selected PRF. The recording and erasing operation is similar for both the $\sqrt{R}$ and the linear readout rasters.

The readout operation of repetitive rasters is controlled by a vertical range deflection sweep of a waveform 552 of FIG. 23, each sweep deflecting the beam from the bottom to the top of the raster as developed by the sweep generator 208. For operation with the linear system of FIG. 4, the horizontal or flight path deflection voltages of a waveform 554 are applied to the horizontal read deflection coils from the summing circuit 211. The integrator 214 develops the decreasing DC level during each movement of the rasters across the total surface 187 as defined by the dumping pulses of the multiar circuit 203. The horizontal read sweep generator 210 develops the horizontal deflection sweeps such as 556 each of which defines a horizontal azimuth scan line. A horizontal read synchronizing pulse controls the sweep generator 210. The multiar circuit 203 increases the DC level of the waveform 554 by discharging the integrator so that the raster periodically moves to the left of the tube surface 187 to start a new series of readout rasters.

For operation with the non-linear sweep, the line sweeps such as 560 of a waveform 558 increase in length and slope from the bottom to the top of each readout raster as controlled by the square root circuit 212 responding to the vertical read sweep of the waveform 552. The pulses of a waveform 562 show the time gating that may be provided at the time gate 110 (FIG. 3) for the non-linear sweep system and at the time gate 110a (FIG. 4) for the linear sweep system. During each readout raster, the pulses decrease in width to eliminate additional arrays read out by the increasing readout line length. Thus the readout process is over a plurality of sequential rasters with the fast sweeps scanning orthogonal to the recorded range sweeps and starting in the left hand half of the stored data as explained relative to FIGS. 20 and 21. Successive sweeps of each readout raster or frame scan out the doppler histories of targets existing at progressively greater ranges. The operation is continuous with a predetermined time relation between recording and reading. For example, the data may be only read out once, that is, each subsequent raster starts reading at the edge of the data read in the previous raster. If the aircraft velocity v is 1000 feet per second, the PRF is 2000 cycles per second and the azimuth −3 db (decibel) resolution distance is 50 feet, the raster time for three displaced phase center synthetic arrays is 150/1000 or 0.15 seconds. Thus, 2000×0.15 or 300 range traces are recorded while reading out one complete raster.

Referring now to FIG. 24, the programmed scanning of a readout raster will be further explained with another illustrative example in which 6 arrays or doppler histories are read out during each line scan of a raster. The readout raster centerline 471 may be centered over a selected number of arrays such as 6 with an azimuth resolution distance of 20 feet between adjacent point reflectors. Each array 475 and 477 at maximum range may represent 1800 feet on the earth's surface with a correspondingly proportional distance on the film (or tube) such as 2 inches. The arrays or doppler histories 475 and 477 may respectively represent the data from the first and second adjacent resolution elements of the surface being illuminated by the radar. The array centerline 473 of the first array 475 is 50 feet to the left of the raster centerline 471. At one-half range, the arrays 479 and 481 respectively representing the doppler histories from the first and second resolution elements of that raster, are each 900 feet long or one-half of that at maximum range. The readout raster width programmed as $\sqrt{R}$ is 1343 feet at one-half range. The line scan time for each azimuth scan at each range will be assumed to be 50 microseconds and the array 475 will be read out in microseconds resulting in the array 479 being read out in 33.4 microseconds. With 20 feet resolution distance in azimuth, the array 477 is read out starting 0.53 microseconds after the array 475 and ending at 47.9 microseconds. At one-half range, the array 479 is read out from time 8.23 microseconds to 41.63 microseconds and the array 481 is p read out from time 8.98 microseconds to 42.38 microseconds. Thus the starting time of the array readout is inversely proportional to $\sqrt{R}$ with increasing range. The time duration of the readout of the arrays at increasing range is directly proportional to $\sqrt{R}$.

Assuming that the array 475 has a frequency excursion from 8 MC (megacycles) to 4 MC, the frequency excursion of the array 479 is from 5.66 MC to 2.83 MC. The readout frequency $f_o'$ is:

$$f_o' = f_i \frac{\text{Time Record}}{\text{Time Read}}$$

where $f_i$ is the input doppler frequency on recording. The frequency conversion factor $$\frac{\text{Time Record}}{\text{Time Read}}$$

at one-half range is 0.707 of that at maximum range. However, the center frequency at maximum range is 6 MC and at one-half range is 4.24 MC. Thus the center frequency of the arrays at each greater range increases as a function of $\sqrt{R}$ as a result of increasing the readout rate at greater ranges so that the translation oscillator is required to establish all center frequencies at a constant value.

It is to be understood that the principles of the invention are not limited to use of a square root function for reading and recording but any appropriate function either fixed or variable is within the scope of this invention. Also, the principles of the invention are not limited to any particular storage medium such as film or scan converter tubes but any suitable storage arrangement may be utilized within the scope of the invention. The principles of the invention are not to be limited to mapping systems or to any particular type or frequency of transmitted energy but the principles of the invention may be utilized with any suitable signal processing system and in response to any type of received energy. Also, the scope of the invention includes processing data from any storage medium regardless of the arrangement utilized to establish the data on the storage medium.

Thus there has been described a system for forming multiple synthetic beams with all beams substantially parallel to each other effectively repeating at positions corresponding to different positions along the flight path. By scanning over more than one doppler history during readout and processing each doppler history signal over the same total frequency excursion thereof, the synthetic beams are effectively formed each with a different phase center so that they correspond to different originating points along the flight path. Each synthetic beam corresponds to a resolution point reflector over the entire range interval because a selected number of arrays are swept from near to far range sequentially in each readout raster. The doppler history signals read out at different times during each azimuth readout line, are applied to a mixer controlled by a swept oscillator so that the time displacement along the flight path at each range interval is converted to frequency displacement. The filter in combination with the delay encountered along the azimuth readout lines causes the targets to appear in time sequence corresponding to their position along the flight path for each azimuth readout line. The all range focusing is provided by the combination of a sweep oscillator and the pulse compression device. The system provides a high degree of azimuth resolution of point objects as well as range resolution thereof. The range resolution may be controlled by the widths of transmission pulses and the quality of the storage and display device.

Another feature in accordance with the principles of the invention is the arrangement to vary the readout raster width proportional to a suitable function such as the square root of range and by also repositioning in frequency the readout doppler histories to correct for the offset change due to the change of the readout raster size. This arrangement utilizes a swept oscillator having a constant slope to form range independent signals and to match the frequency-versus-time characteristics of the compression filters. On the final display a similar raster is formed controlled by a similar function such as the square root of range so that a constant display resolution is maintained at all ranges.

In another arrangement in accordance with the invention, a linear readout sweep is utilized in combination with a variable slope swept oscillator to provide a desirable display by utilizing a trapezoidal display function.

What is claimed is:

1. A synthetic array processing system responsive to doppler history signals each representative of points on a surface comprising:

frequency offset signal forming means for developing a plurality of doppler history signals having time relations representative of the position of points on the surface and each having a first predetermined time versus frequency slope;

heterodyning means responsive to said doppler history signals for controlling said doppler history signals to have a second predetermined time verses frequency slope;

and dispersive delay means coupled to said heterodyning means for developing a pulse from each doppler history signals said dispersive delay means having a time versus frequency characteristic that is substantially matched to said second predetermined time versus frequency slope.

2. The combination of claim. 1 in which said dispersive delay means is an ultrasonic dispersive delay line and in which difference frequency signals are developed by said heterodyning means for application to said ultrasonic dispersive delay line.

3. A synthetic array processing system responsive to doppler history signals each representative of points on a surface comprising:

signal forming means for developing a plurality of doppler history signals having time relations representative of the position of points on the surface and each having substantially the same center frequency, wherein said signal forming means includes:

(i) coherent radar means for transmitting energy to a remote surface and for developing doppler traces representative of positions of objects on said remote surface, (ii) recording means responsive to said radar means for recording said doppler traces in range and azimuth on a storage surface, and (iii) scanning means coupled to said recording means for scanning said storage surface in azimuth at predetermined range positions to develop a plurality of doppler history signals at each range position;

heterodyning means responsive to said doppler history signals to vary the center frequency thereof as a function of time;

dispersive delay means coupled to said heterodyning means for developing a pulse from each doppler history signal, said pulses having a time relation as a function of the center frequency of said doppler history signals;

utilization means, including a utilization scanning circuit, coupled to said dispersive delay means and to said scanning means for time relating the pulses in range and azimuth;

an azimuth sweep generator coupled to said scanning means for controlling the length of azimuth scan of said scanning means as a function of the square root of range;

an offset mixing means coupled between said scanning means and said heterodyning means and responsive to said azimuth sweep generator for varying the center frequency of said doppler history signals as a function of the square root of range; and means coupling said azimuth sweep generator to said utilization scanning circuit of said utilization means to control the length of azimuth scan thereof as a function of the square root of range.

4. The combination of claim 1 in which said dispersive delay means is an ultrasonic dispersive delay line.

5. The combination of claim 1 further comprising an azimuth sweep generator coupled to said scanning means for sweeping said scanning means in azimuth with substantially equal lengths at each range position, a range sweep generator for controlling said azimuth sweeps over the plurality of range positions, a utilization scanning circuit included in said utilization means, and means coupling said utilization means to said azimuth sweep generator and to said range sweep generator to control the length of azimuth scan as a function of range in said utilization scanning circuit included in said utilization means.

6. A synthetic array processing system responsive to doppler history signals each representative of the azimuth and range of points over a range and azimuth interval of a remote surface comprising first means for storing said doppler history signals on a storage surface in range and in azimuth, second means responsive to said first means for developing a plurality of the doppler history signals during each of a plurality of azimuth time periods of scanning along said storage surface, said azimuth time periods being repetitive over a range interval of said storage surface, each of said doppler history signals having a time relation representative of the position of a different point on the surface, each having a time versus frequency slope, and each having substantially the same center frequency, mixing means responsive to said doppler history signals to vary the center frequency thereof as a function of time during each azimuth time period and to develop a predetermined time versus frequency slope, ultrasonic dispersive delay means coupled to said mixing means and having a time versus frequency characteristic that is the conjugate of said predetermined time versus frequency slope for developing pulses having a time relation as a function of the center frequency of said doppler history signals provided by said mixing means, and mapping means coupled to said second means and to said dispersive delay means for relating the pulses in time during each azimuth time period over the range interval.

7. The combination of claim 6 in which control means are coupled to said second means for scanning in said azimuth dimension over said surface during each azimuth time period a distance as a function of the square root of range, in which translation oscillator means are coupled between said reading means and said mixing means to vary the center frequency of said doppler history signals as a function of the square root of range to establish the substantially same center frequency, and in which said mapping means includes scanning means coupled to said control means for varying the length of azimuth scan during periods corresponding to said azimuth scan periods, as the function of the square root of range.

* * * * *